United States Patent
Stettner et al.

(10) Patent No.: US 8,743,176 B2
(45) Date of Patent: Jun. 3, 2014

(54) 3-DIMENSIONAL HYBRID CAMERA AND PRODUCTION SYSTEM

(75) Inventors: Roger Stettner, Santa Barbara, CA (US); Brad Short, Goleta, CA (US); Patrick Gilliland, Santa Barbara, CA (US); Tom Laux, Solvang, CA (US); Laurent Heughebaert, Santa Paula, CA (US)

(73) Assignee: Advanced Scientific Concepts, Inc., Santa Barbara, CA (US)

( * ) Notice: Subject to any disclaimer, the term of this patent is extended or adjusted under 35 U.S.C. 154(b) by 984 days.

(21) Appl. No.: 12/782,845

(22) Filed: May 19, 2010

(65) Prior Publication Data

US 2010/0309288 A1 Dec. 9, 2010

Related U.S. Application Data

(66) Substitute for application No. 61/179,949, filed on May 20, 2009.

(51) Int. Cl.
*H04N 13/00* (2006.01)
*H04N 13/02* (2006.01)

(52) U.S. Cl.
CPC ....... *H04N 13/0055* (2013.01); *H04N 13/0239* (2013.01)
USPC .............................. 348/43; 348/42

(58) Field of Classification Search
None
See application file for complete search history.

(56) References Cited

U.S. PATENT DOCUMENTS

| | | | |
|---|---|---|---|
| 4,734,756 A | 3/1988 | Butterfield et al. | |
| 4,977,450 A * | 12/1990 | Yokota | 348/71 |
| 5,629,524 A | 5/1997 | Stettner et al. | |
| 5,696,577 A | 12/1997 | Stettner et al. | |
| 6,133,989 A | 10/2000 | Stettner et al. | |
| 6,271,511 B1 * | 8/2001 | Pierle | 250/214 VT |
| 6,362,482 B1 | 3/2002 | Stettner et al. | |
| 6,414,746 B1 | 7/2002 | Stettner et al. | |
| 6,760,134 B1 | 7/2004 | Schilling et al. | |
| 8,217,993 B2 * | 7/2012 | Luisi et al. | 348/48 |
| 2002/0117340 A1 | 8/2002 | Stettner et al. | |
| 2003/0063185 A1 * | 4/2003 | Bell | 348/46 |
| 2008/0158346 A1 * | 7/2008 | Okamoto et al. | 348/47 |
| 2008/0170118 A1 * | 7/2008 | Albertson et al. | 348/46 |

FOREIGN PATENT DOCUMENTS

WO    WO 2007081628 A2 *    7/2007

* cited by examiner

*Primary Examiner* — Mehrdad Dastouri
*Assistant Examiner* — James Anderson, II
(74) *Attorney, Agent, or Firm* — Allen I. Rubenstein

(57) ABSTRACT

A hybrid three dimensional imaging camera comprises a 2-D video camera utilizing a focal plane array visible light detector and a 3-D flash laser radar utilizing an infrared focal plane array detector. The device is capable of capturing a complete 3-D scene from a single point of view. A production system combining multiple hybrid 3-D cameras around a subject provides 3-D solid models of an object or scene in the common field of view.

20 Claims, 14 Drawing Sheets

Receive Sensor
Type 1

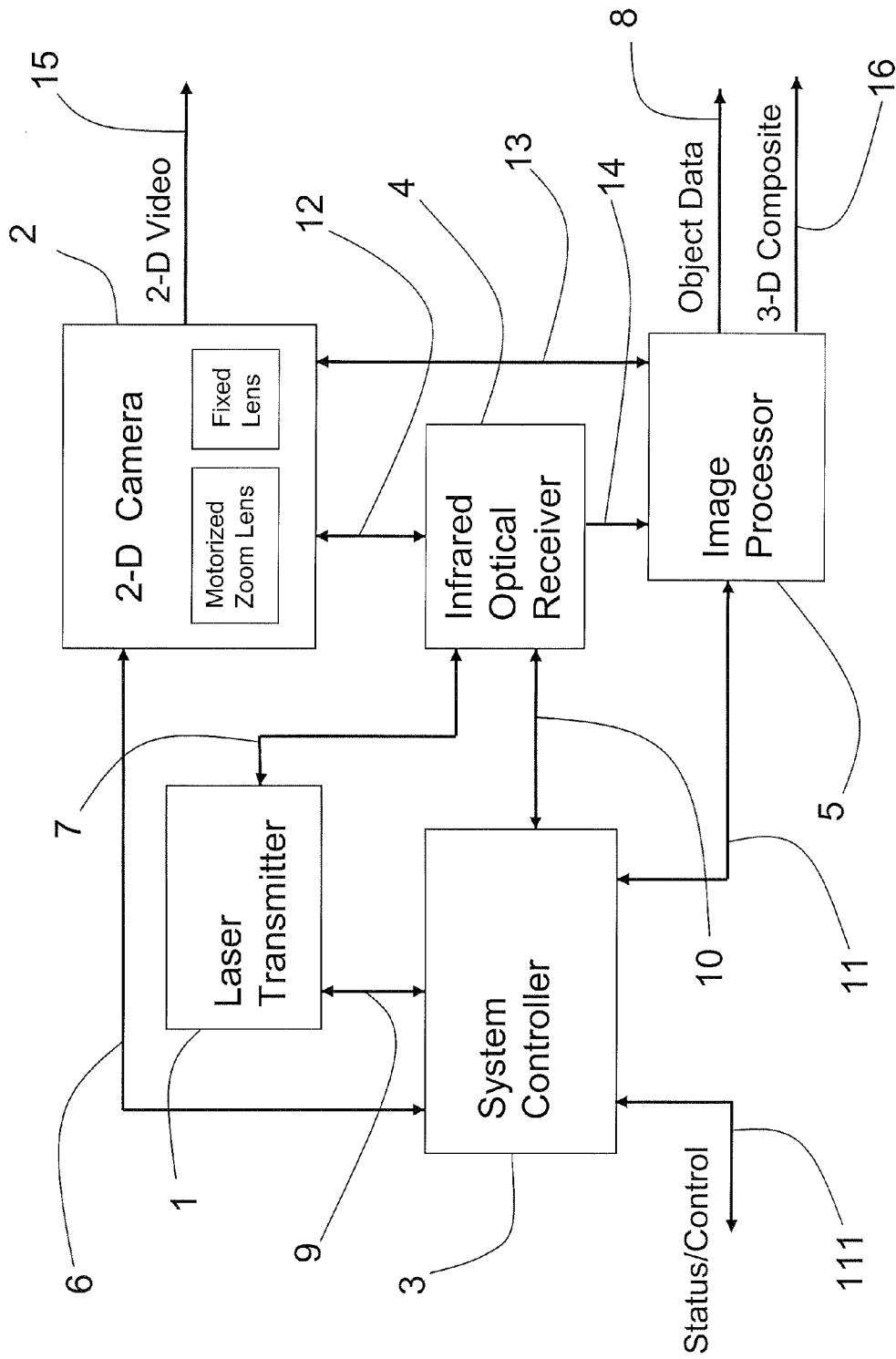
Figure 1 System Block Diagram

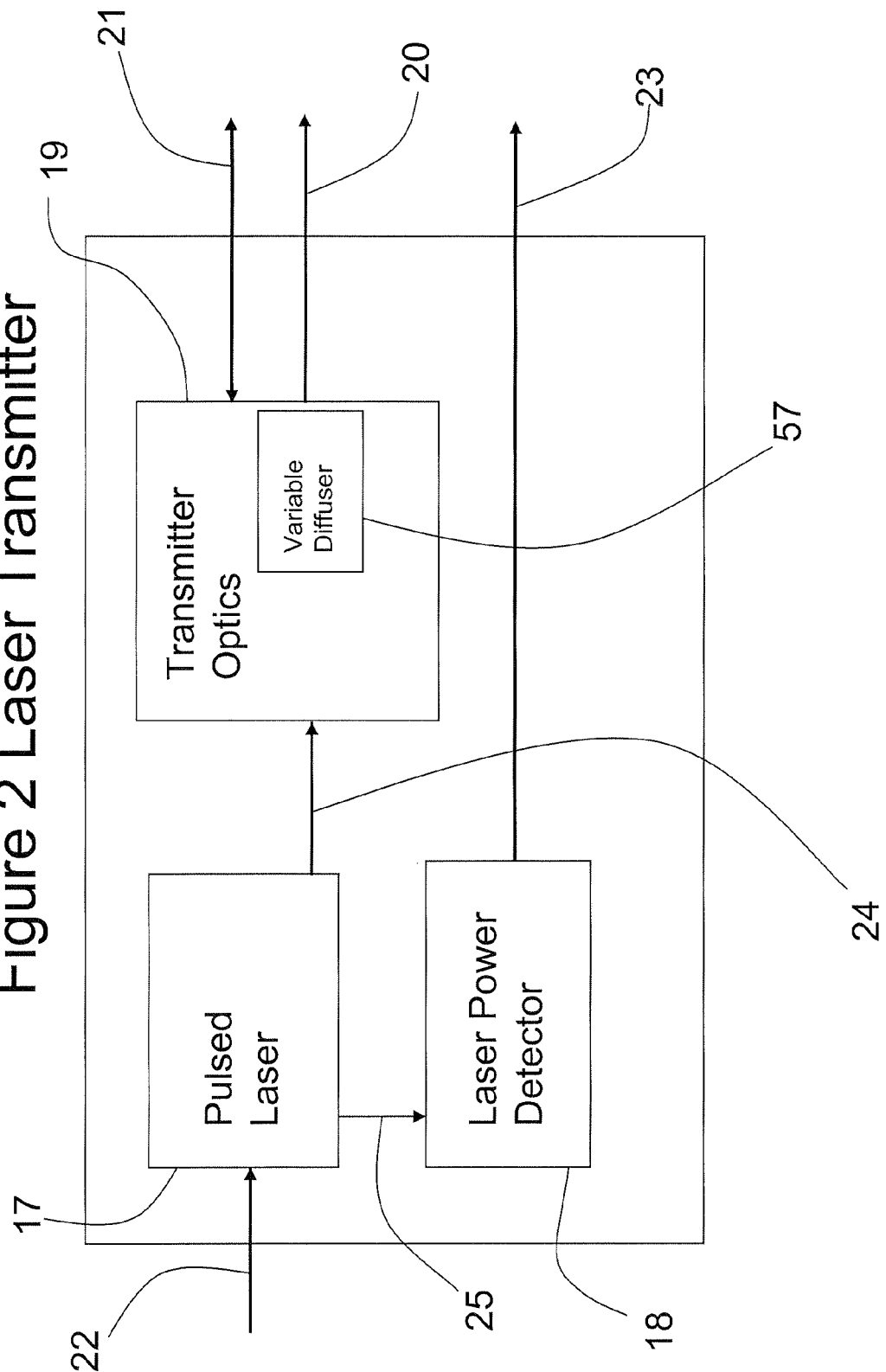

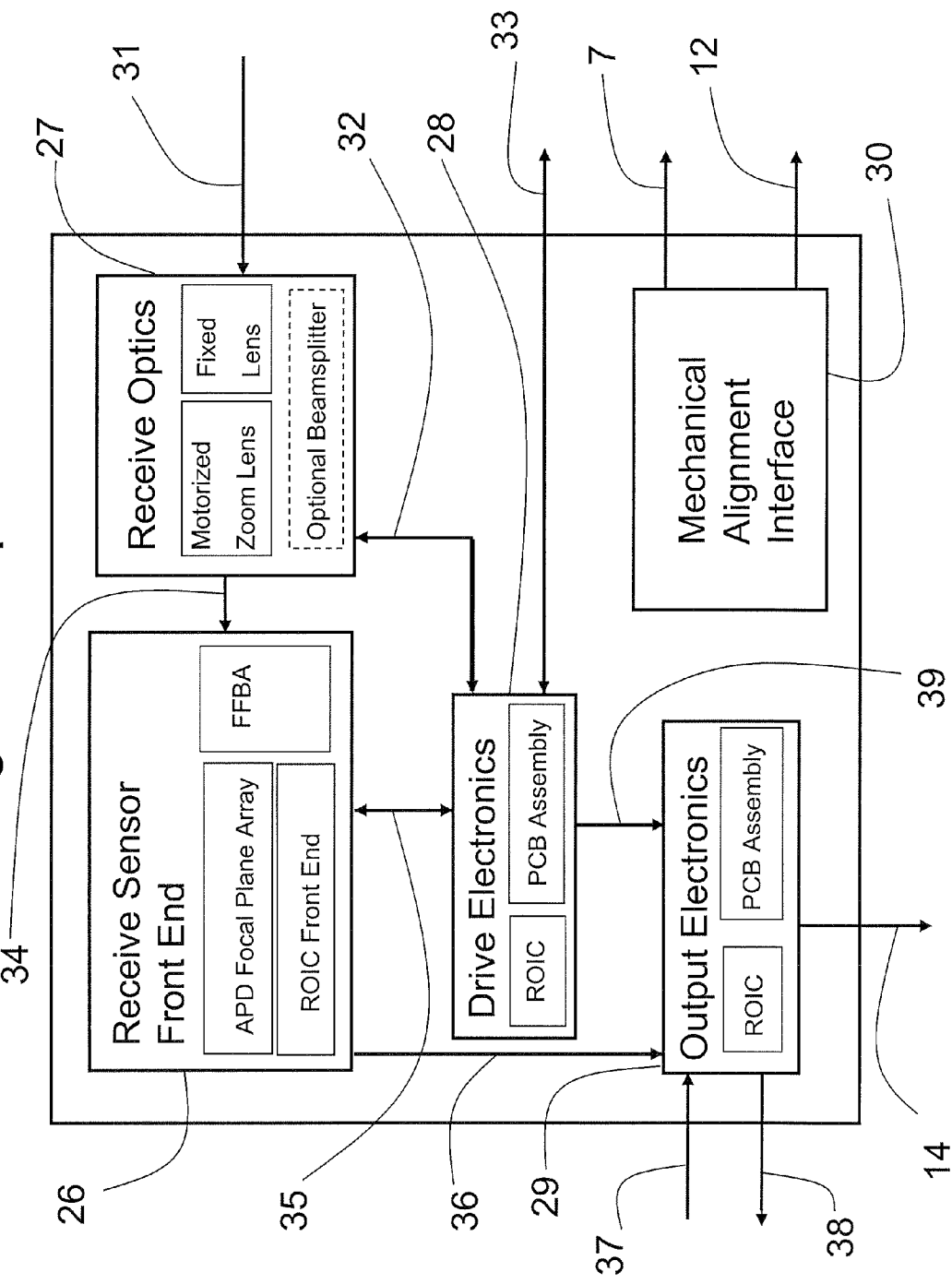
Figure 3 Optical Receiver

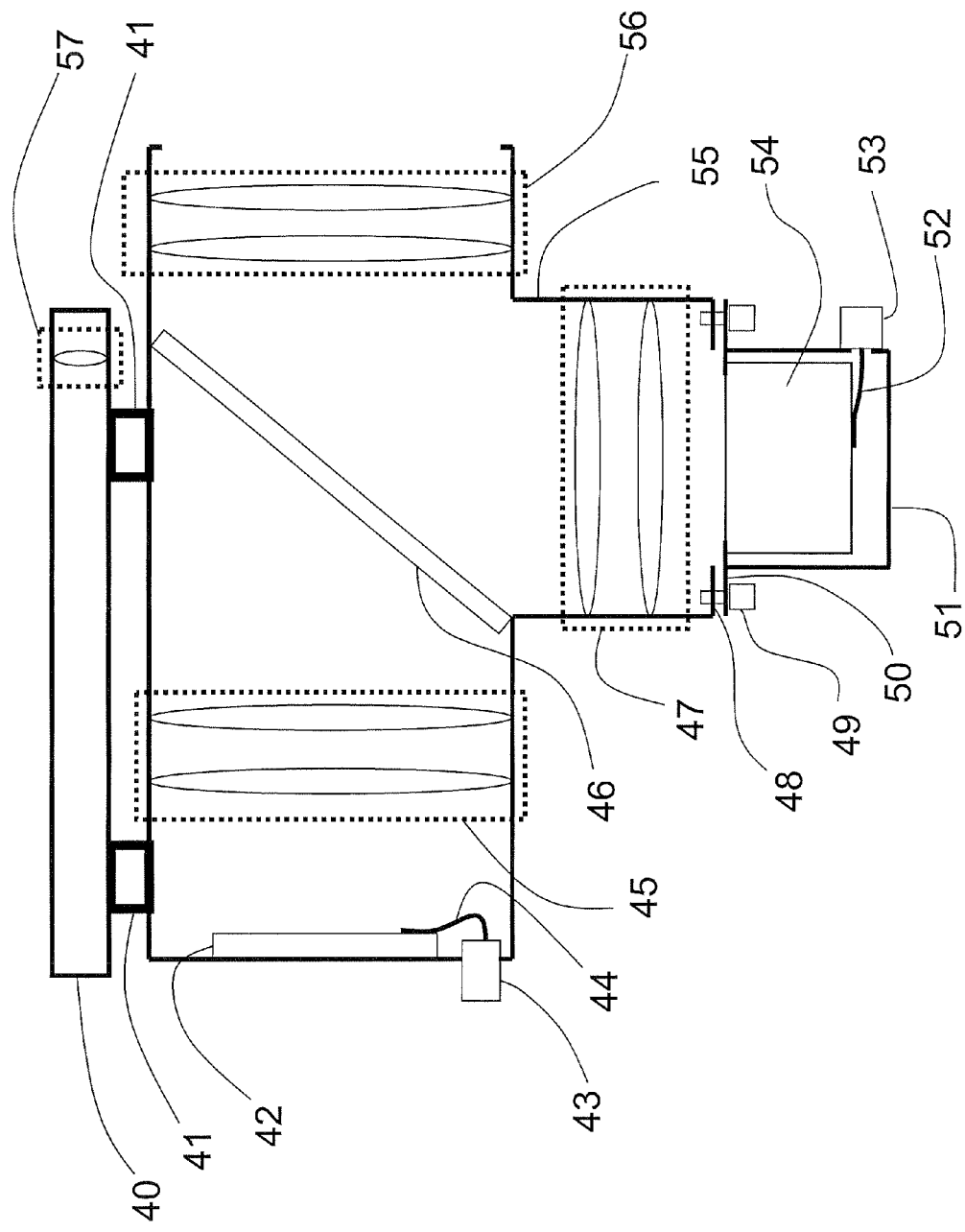
Figure 4 Integrated Hybrid 3-D Camera

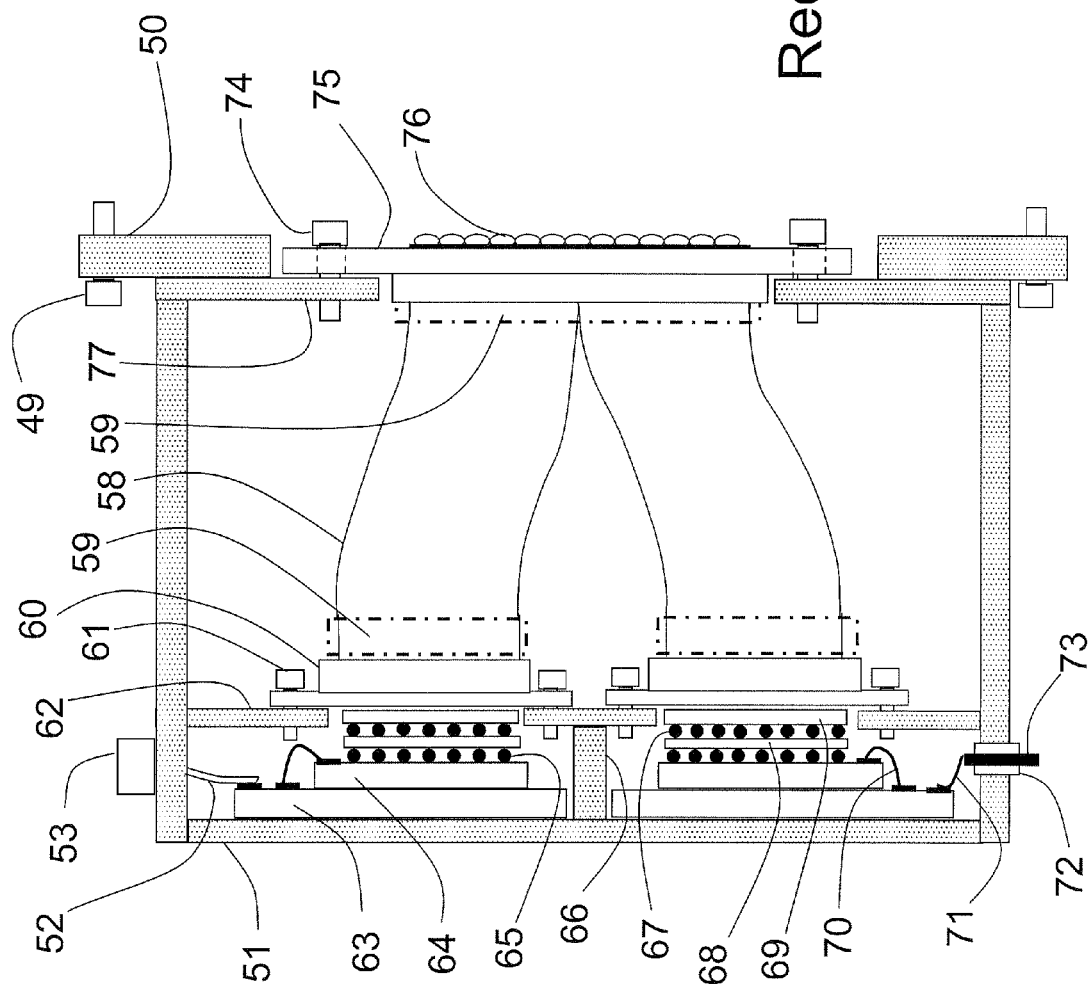

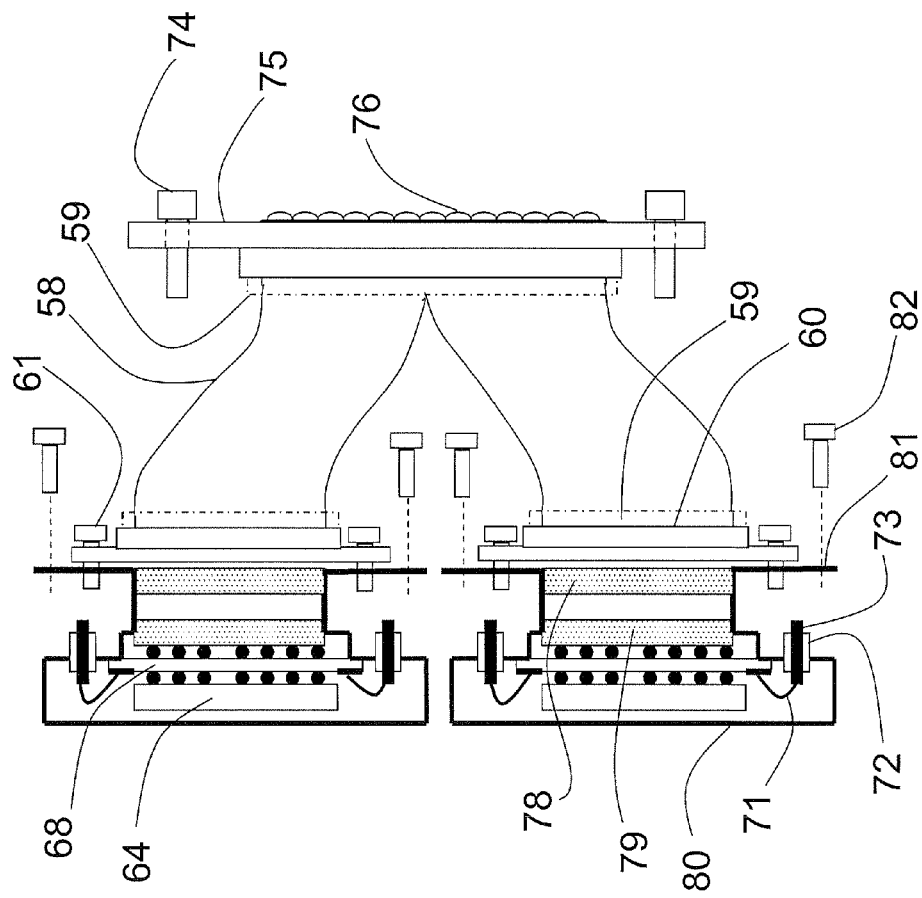
Figure 6 Receive Sensor Type 2 Sub Assembly

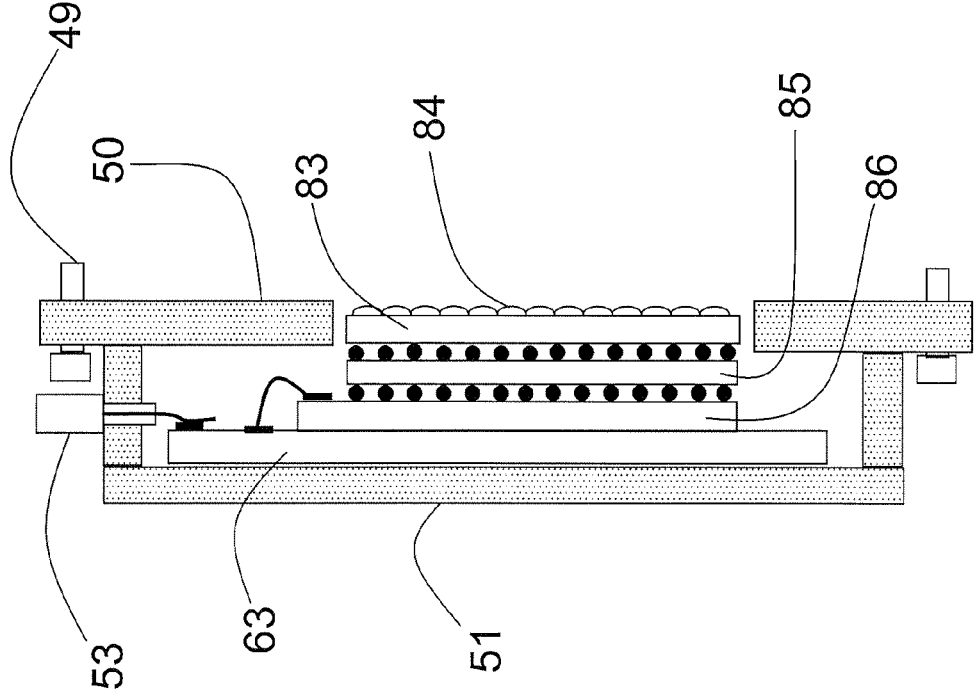
Figure 7 Receive Sensor Type 3

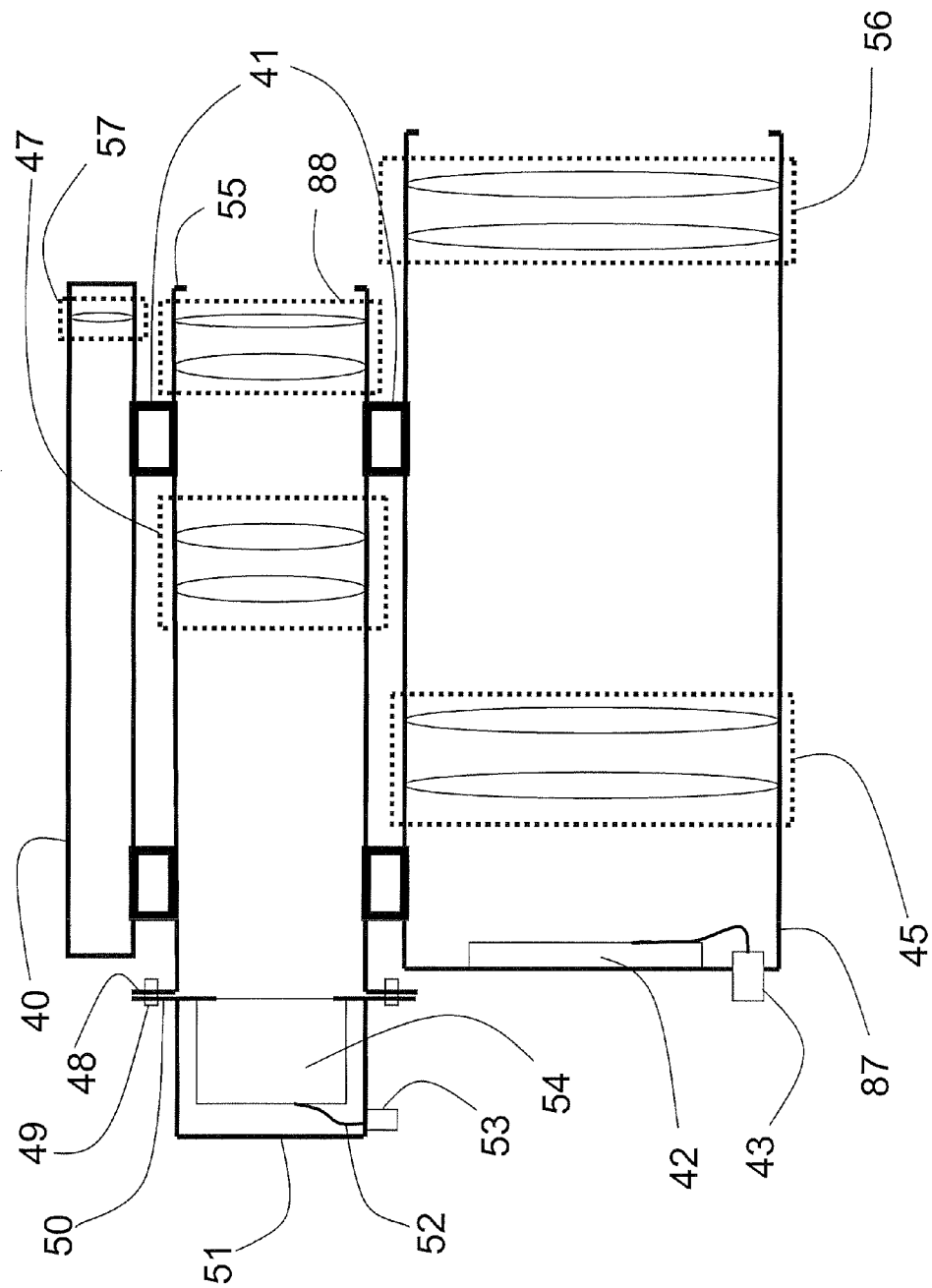

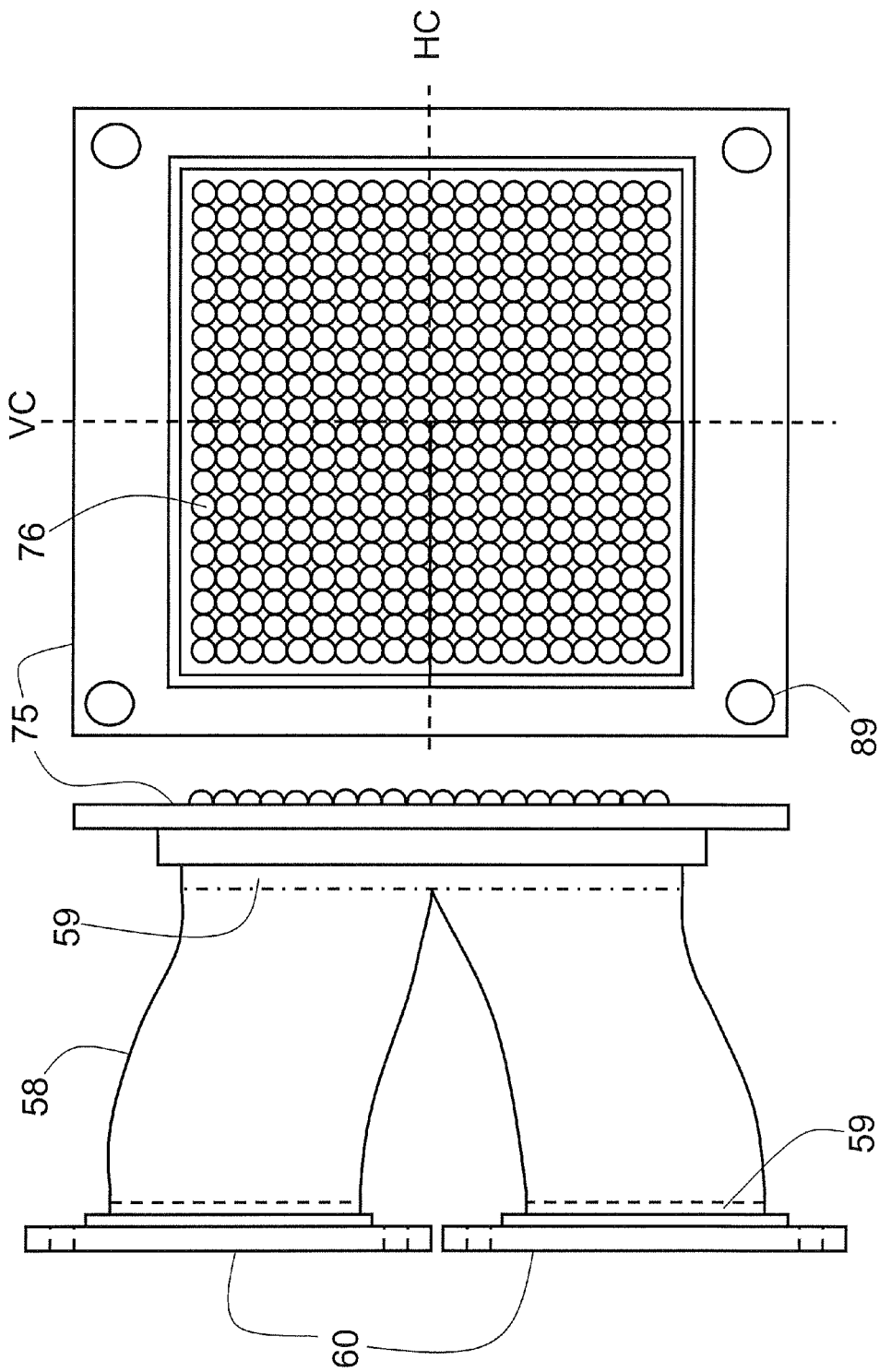
Figure 9 Fused Fiber Breakout Assembly – 2 x 2

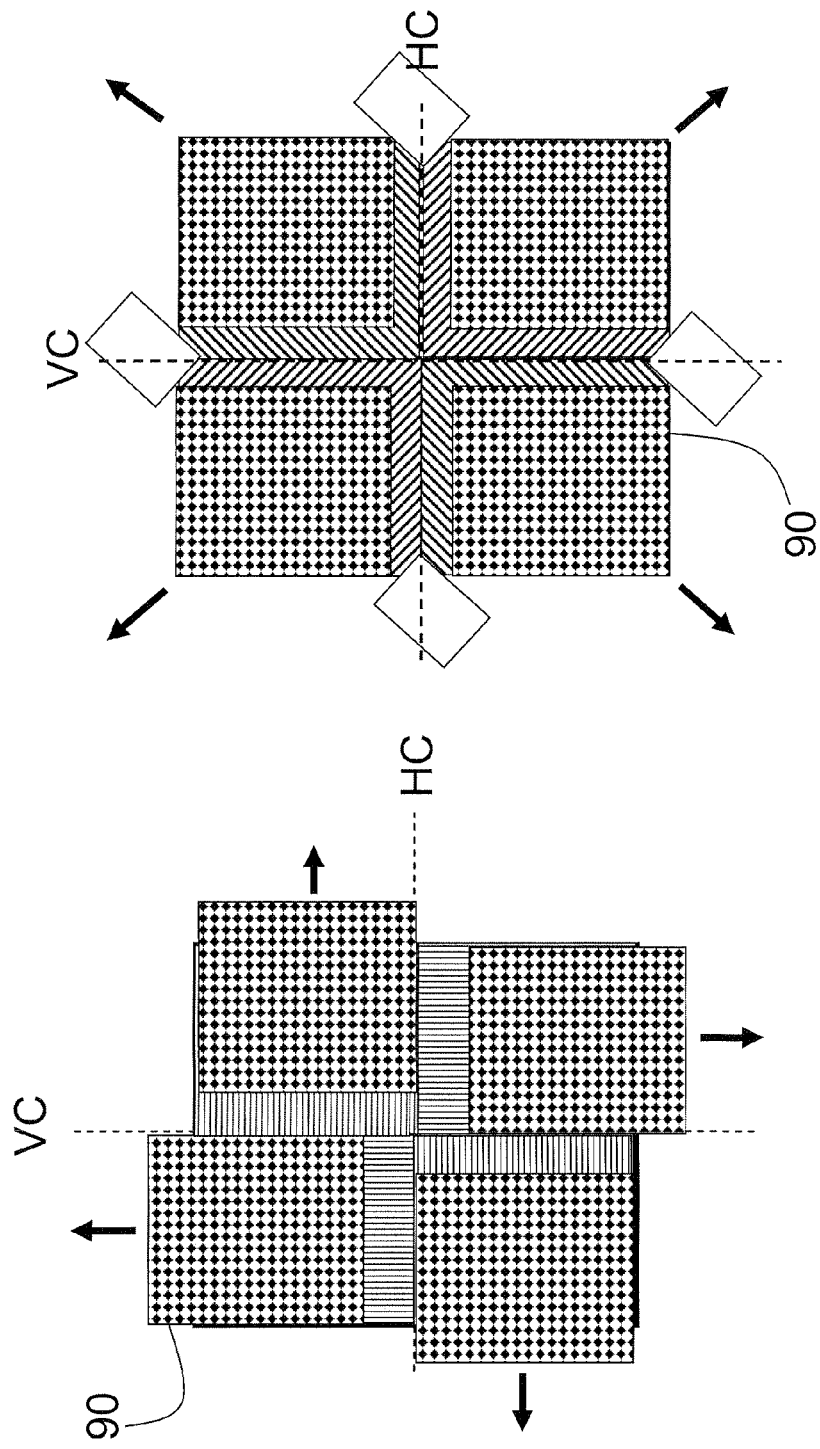
Figure 9A. Fused Fiber Breakout Terminal Displacement

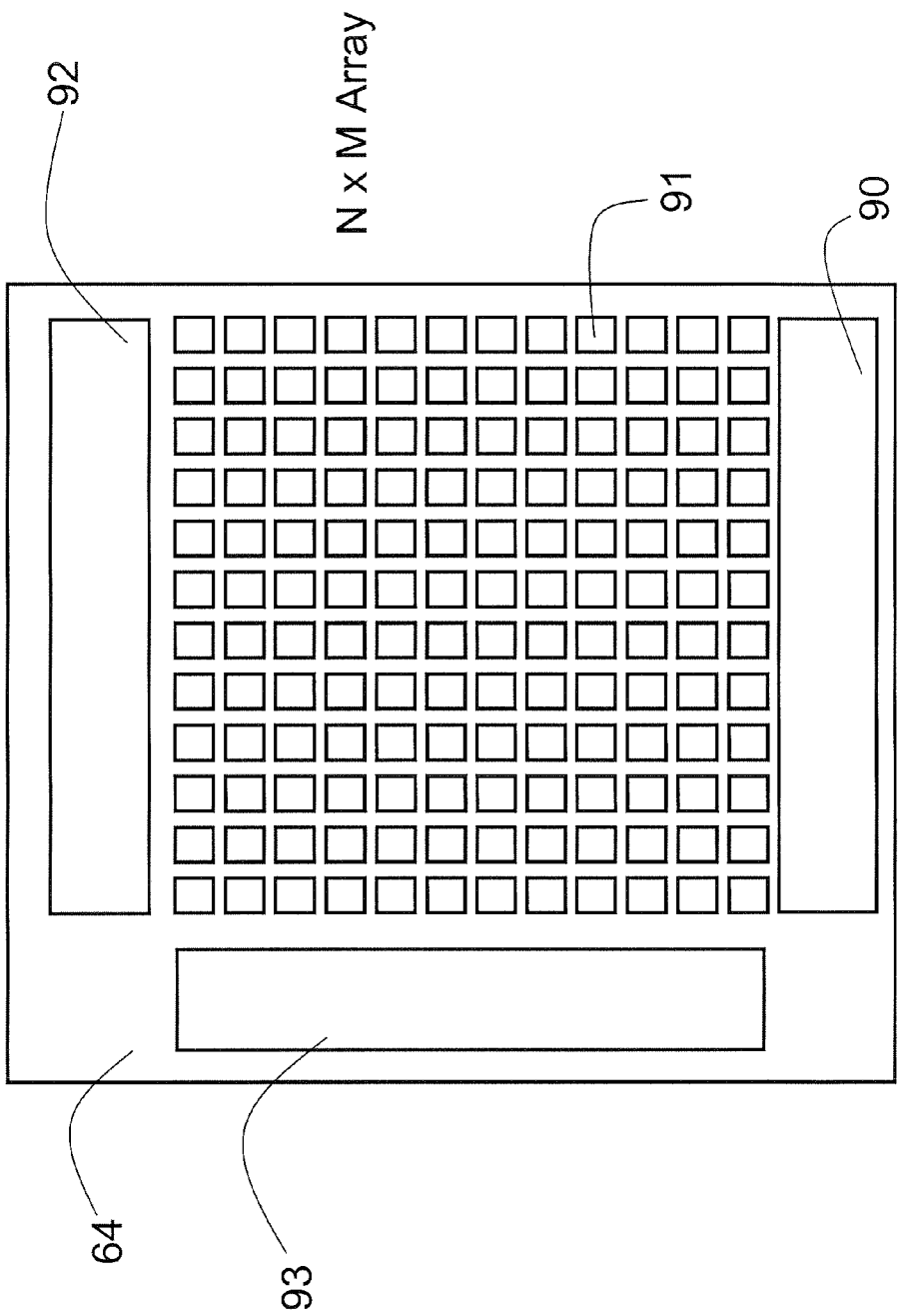
Figure 10 Readout Integrated Circuit

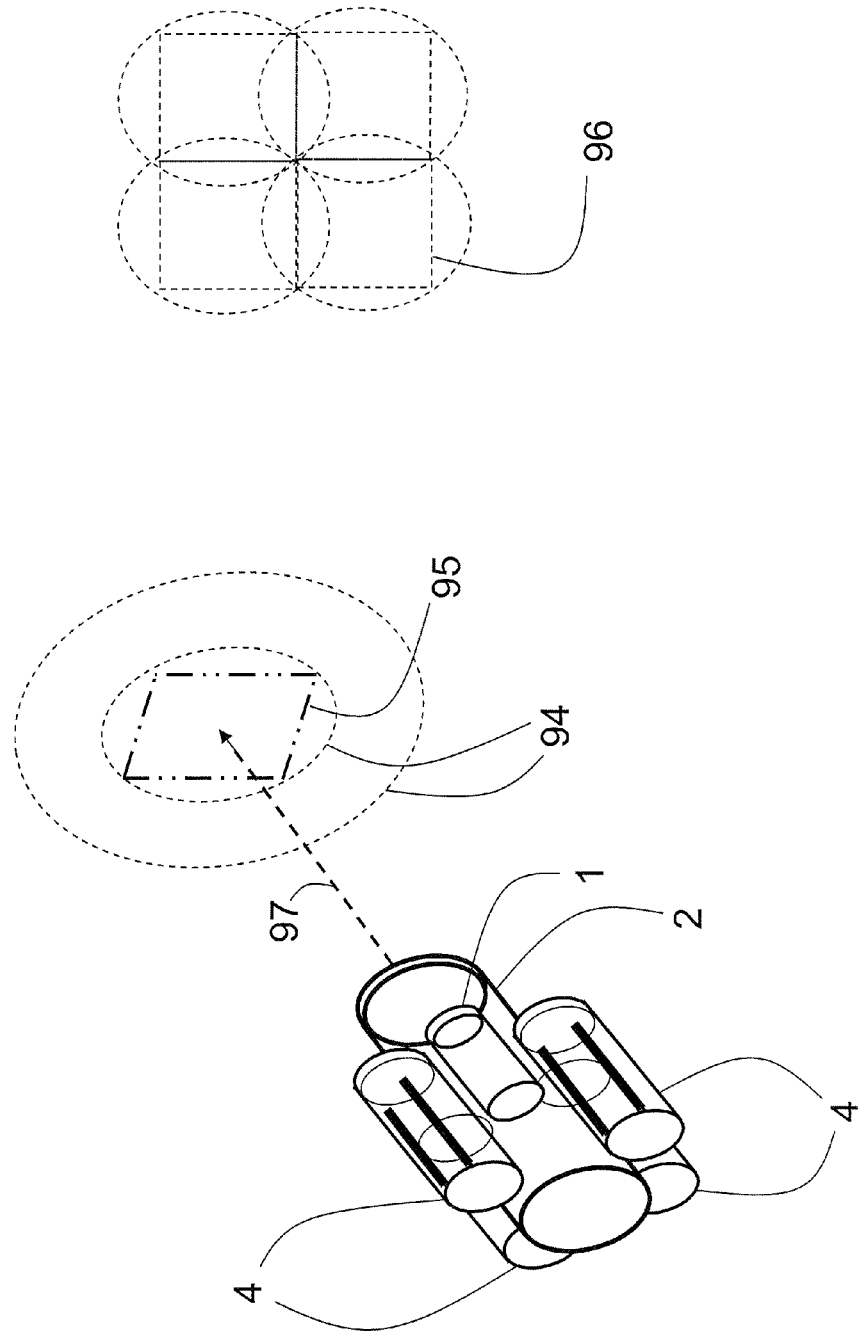
Figure 11 Multiple Receiver Spatial Resolution Enhancement

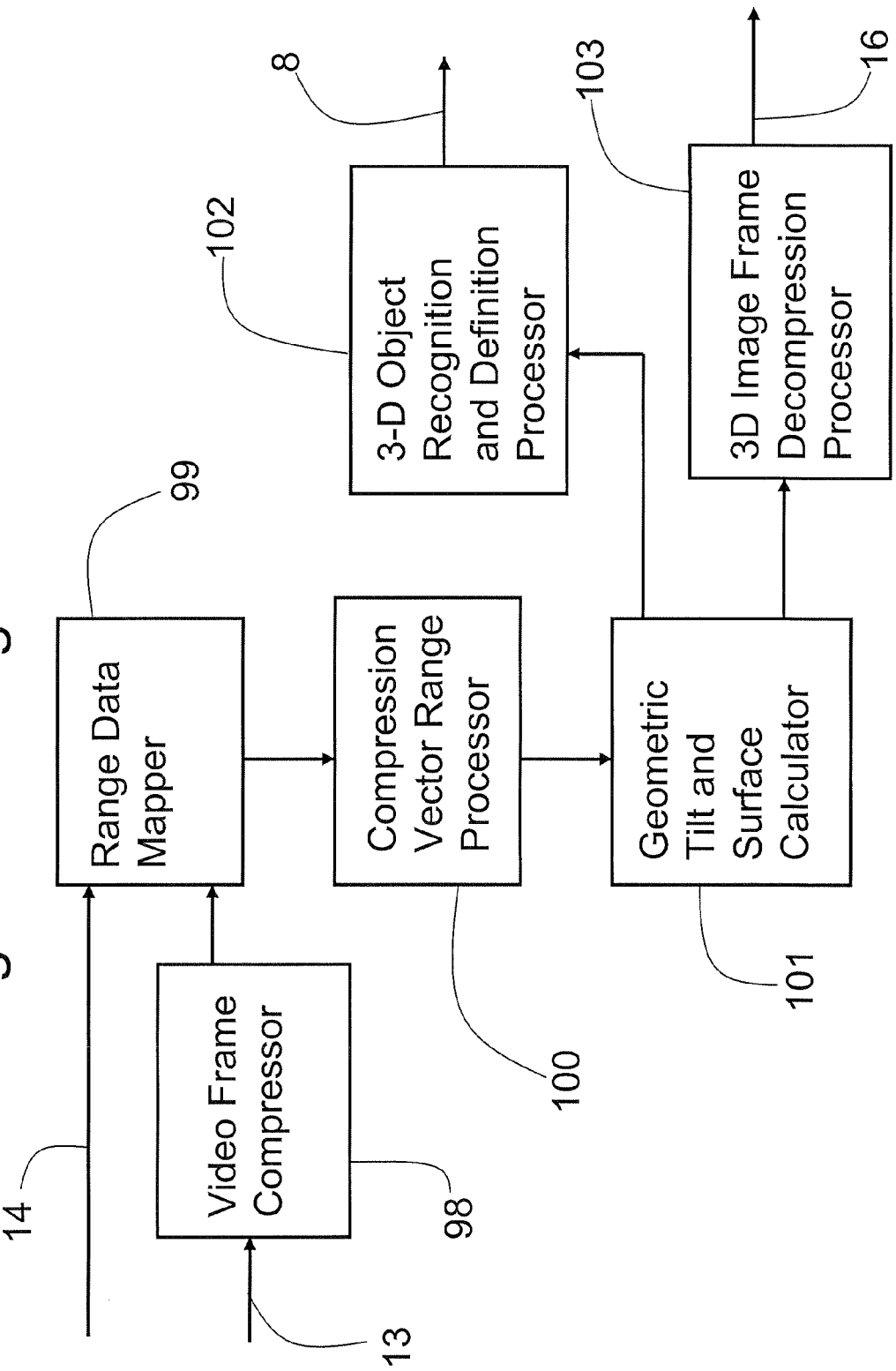

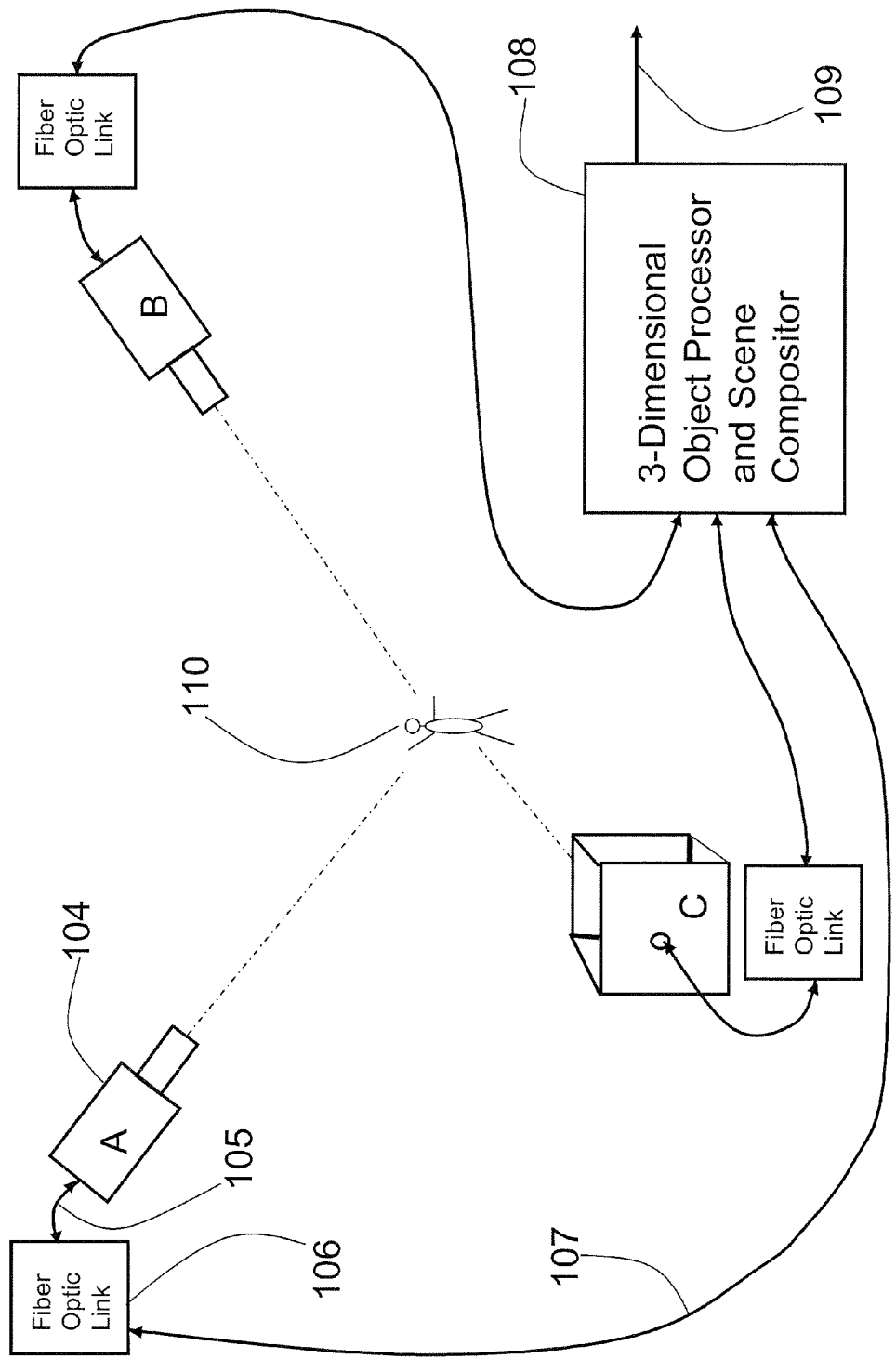

3-DIMENSIONAL HYBRID CAMERA AND PRODUCTION SYSTEM

RELATED APPLICATIONS

This application claims priority of U.S. provisional patent application 61/179,949, filed May 20, 2009.

FIELD OF THE INVENTION

The present invention is a device for producing 3-dimensional imagery and object data from the hybrid combination of a traditional visible 2-D focal plane video or still camera with a 3-D flash infrared laser ranging and imaging system. A production system utilizing multiple hybrid 3-D cameras is also disclosed. Both 3-D viewing and 3-D object definition are supported and enabled by the described invention as well as 3D modeling of a solid object or scene. This invention relies on the performance of a multiple pixel, infrared laser radar for capturing three-dimensional images of objects or scenes within the field of view with a single laser pulse, with high spatial and range resolution.

BACKGROUND OF THE INVENTION

Many attempts have been made to bring the 3-D viewing experience to film, video, and broadcast displays. Stereoscopic cameras with merged outputs have been used to capture binary images of a solid object or scene. Inexpensive eyeglasses with plastic color or polarizing filters were used to separate the two images projected in different colors or polarizations on a television, movie screen, or computer display, and a quasi-3D image could be observed, albeit with some aberrations. Holographic true 3-D image capture and display technology has been demonstrated under well-controlled conditions. Holographic display and image capture technology is limited in its application because of various challenges including the extremely precise alignments required.

New technologies have been pioneered by the display industry that show great promise of producing a true 3-D viewing experience. What is needed is a better and more robust way to define and record the 3-D still and video data and to produce 3-D solid models of an object or scene. The present invention is a 3-D camera and production system incorporating elements of the 3-D technology disclosed in Stettner et al, U.S. Pat. Nos. 5,696,577, 6,133,989, 5,629,524, 6,414,746B1, 6,362,482, and U.S. patent application US 2002/0117340 A1, and which provides with a single pulse of light all the information of a conventional 2-D picture along with the third dimension coordinates and reflected intensity.

Conventional 2-D cameras for capturing visible images rely on rectangular arrays of pixilated light sensitive Charge Coupled Devices (CCDs) or CMOS sensors. These sensors are generically referred to as focal plane arrays. They are positioned directly behind an imaging lens system in the focal plane of the lens.

The described device furnishes the 3-D coordinates of every reflective point in its field of view, and provides for registration and integration of these range data pixels with the output of a conventional visible 2-D imaging system, to produce a true 3-D visual image frame. The system further provides a 3-D object definition and modeling capability by coupling multiple hybrid 3-D camera systems via fiber optic link to a scene compositor which is capable of developing 3-D imagery and fully rendering the dimensions of any object or scene in the common field of view.

U.S. Pat. No. 4,734,756 issued to Butterfield et al, describes a stereoscopic camera and viewing system which makes use of chromatic viewing devices, typically anaglyph glasses, to channel each stereoscopic image the appropriate eye.

U.S. Pat. No. 6,760,134 issued to Schilling et al, shows a three dimensional true color holographic imaging system using three primary color Fresnel-Zone-Pattern laser generators combined as a single beam. The combined beam is then scanned across the target and the reflections sensed by a single electronic detector. The detector signals corresponding to each generator are then separated electronically.

BRIEF DESCRIPTION OF THE INVENTION

The present invention comprises a hybrid 3-D camera for producing true 3-D images from a single light pulse by combining a visible light 2-D camera with the output of a pixilated flash infrared laser radar. It is assumed the number of pixels associated with the 2-D visible camera will be greater than the number of pixels available from the flash laser radar.

The laser radar described herein relies on the performance of a focal plane array detector. The detector in this case responds to wavelengths outside the visible range, in the near infrared spectrum. The detector material is a binary compound of Indium Phosphide (InP), or a more exotic quaternary compound such as Indium Gallium Arsenide Phosphide (InGaAsP) or a ternary combination of InGaP, InGaAs, or InAsP.

The wavelength of choice for the laser radar is typically 1570 nanometers, which enables the invention in two respects: first, the 1570 nm wavelength is inherently safer to the human eye, allowing for greater power transmission, and thus greater distance performance, and second, there are laser sources commercially available at this wavelength capable of producing the high energy pulse required. Other wavelengths may also be suitable for the laser radar and these other wavelengths may be utilized within the scope of this invention.

Several adaptations of the flash laser radar hardware enhance the effective number of pixels of the laser radar to more closely match the number available from the 2-D camera. Another adaptation of the flash laser radar hardware seeks to mitigate the difference in pixel density by creating an intelligent mapping of the laser radar data into the 2-D camera field of view by use of various algorithms on the 2-D camera output data frame before it is merged with the laser radar data. In some cases, commonly known compression algorithms compress the 2-D camera data spatially, in order to create a best fit with the laser radar data. When appropriately uncompressed, this combined image results in a true 3-D visual image taken from a single viewing axis.

The hybrid 3-D camera has an image processor to intelligently merge a 2-D visible image with the flash laser radar range and intensity data. Coupled to the hybrid 3-D camera is a production system which is capable of rendering a complete 3-D composite scene viewable from any angle. The 3-D scene compositor uses the 3-D information from a plurality of the described 3-D hybrid cameras, each positioned with a viewing axis spaced apart by a solid angle, to produce solid object data for any target object within the common field of view. This combining production system largely eliminates the limitations created by shadows when measuring the surfaces of a solid object for a complete rendering of the object dimensions. This results in a production system which can create a complete solid model of a 3-D object or scene.

Because great resources have been dedicated to the pursuit of the CCD and CMOS visible focal plane arrays, and because the material system is Silicon, the available array size is typically much greater for a conventional 2-D visible focal plane array than for a near infrared focal plane array in InP. For example, the state of the art in still camera FP arrays is in the 12 megapixel range. The array size for the near IR FP arrays used in the current laser radar is 128×128, or 16,384 pixels. Therefore, it is unlikely the laser radar utilizing these near infrared detectors will ever have quite as high a number of pixels as the visible light 2-D focal plane arrays upon which most digital still and video cameras are based. Consequently, a simple pixel-by-pixel overlay of 3-D range data onto the 2-D visible array image data is not practical.

The instant invention circumvents this shortcoming in the focal plane array pixel density in the case of the near IR focal plane arrays by using a number of novel and unique adaptations which will in effect, expand the pixel density via duplication of the arrays, coupled with an appropriate optical design to enable this duplication. Another aspect of the invention focuses on the redundancy in the 2-D camera images, by compressing these images into a form where the density of the image is on a similar scale to the IR focal plane arrays. The end result of this invention is a complete 3-D image frame taken from a single viewing axis.

In a further development of this invention, a production system is described wherein any object within the common field of view of a set of multiple hybrid 3-D cameras, each with an independent viewing axis, is fully rendered in all of its dimensions. This production system is capable of producing a fully rotatable 3-D model of any object or scene in the common field of view.

BRIEF DESCRIPTION OF THE DRAWINGS

FIG. 1 is a system block diagram of the hybrid 3-D camera comprised of a 2-D video camera and a flash laser radar. The hybrid 3-D camera comprises a laser transmitter 1, a 2-dimensional video camera 2, a system controller 3, an infrared optical receiver 4, and an image processor 5;

FIG. 2 shows the details of the laser transmitter denoted by the number 1 in FIG. 1;

FIG. 3 is a block diagram of the infrared optical receiver denoted by the number 4 in FIG. 1;

FIG. 4 shows one mechanical layout of the laser transmitter denoted by the number 1, 2-D video camera denoted by the number 2, and infrared optical receiver denoted by the number 4 of FIG. 1;

FIG. 5 shows the receive sensor assembly denoted by the number 54, electrical connector denoted by the number 53, electrical wiring denoted by the number 52, sensor assembly housing denoted by the number 51, sensor assembly housing flange denoted by the number 50, and sensor assembly fastening screw denoted by the number 49, in FIG. 4;

FIG. 6 shows an alternative receive sensor assembly denoted by the number 54 in FIG. 4, minus any of the housing detail of FIG. 5;

FIG. 7 shows another alternative receive sensor assembly denoted by the number 54 in FIG. 4, minus any of the housing details of FIG. 5;

FIG. 8 shows an alternative mechanical layout of the laser transmitter denoted by the number 1, 2-D video camera denoted by the number 2, and infrared optical receiver denoted by the number 4 of FIG. 1;

FIG. 9 shows a fused fiber breakout assembly which is incorporated in the drawings of FIG. 5 and FIG. 6 minus the housing and detector details;

FIG. 10 illustrates the Readout Integrated Circuit denoted as number 63 in FIG. 5 and FIG. 6;

FIG. 11 presents an alternate method of achieving the higher spatial resolution or 3-D pixel density realized by the drawings of FIG. 4 and FIG. 8, by increasing the number of flash laser radar systems and overlapping their fields of view;

FIG. 12 is a block diagram of the image processor 5 of FIG. 1;

FIG. 13 shows an installation of multiple hybrid 3-D cameras as described in FIG. 1, which together enable full 3-D rendering of an object or scene within the common field of view.

DETAILED DESCRIPTION OF A PREFERRED EMBODIMENT OF THE INVENTION

A preferred embodiment of the present invention, the 3-Dimensional Hybrid Visible and Infrared Laser Radar Camera (the "hybrid 3-D camera") is depicted in block diagram form in FIG. 1. The system is designed to produce a 3-dimensional image from a conventional 2-D video or still camera 2, based on a conventional CMOS or CCD focal plane array, coupled with a flash laser radar. The flash laser radar is capable of producing range and intensity data for any object or scene within its field of view from a single pulse of laser transmitter 1, in conjunction with system controller 3, and infrared optical receiver 4. The shorthand term "flash laser radar" may be used herein to refer to laser transmitter 1, system controller 3, and infrared optical receiver 4 collectively, and to their mutual operation.

Image processor 5 signals 2-D camera 2 when it is ready to accept data (2DIN_RDY) via bidirectional electrical connection 13, and then receives 2-D image data from the 2-D camera 2 via bidirectional electrical connection 13. Image processor 5 also receives range and intensity data (RDAT, IDAT) from infrared optical receiver 4 of the flash laser radar via electrical connection 14. Image processor 5 uses various mathematical and logical algorithms to compare and merge the visible 2-D camera data with the 3-D range and intensity data. This merged data is then transformed into 3-D video or still format (3D_COMP) and transmitted via output 16 to a recording or display device (not shown). A secondary output 8 transmits raw object and scene data (OBJ_DAT) to a 3-D object processor and scene compositor. System controller 3 receives a ready signal (IPRO_RDY) from the image processor 5 via bidirectional electrical connection 11 when it is has completed processing of the previous frame of video or still picture. The system controller then issues a 3D_CONVERT command to the image processor 5 when the 2D camera 2 and infrared optical receiver 4 outputs are ready.

System controller 3 is capable of operating either in a slave mode to the 2-D camera, or as master system controller, communicating with 2-D camera 2 via bidirectional electrical connection 6. When in a slave mode, the system controller 3 is notified by the 2-D camera 2 of the position of its motorized zoom lens (ZOOM_STATUS), the ready status of the 2-D video (DATA_RDY), and when to initiate the 3-D laser radar operation via bidirectional electrical connection 6. The signal to initiate the 3-D flash laser radar operation may be a SYNC signal from the 2-D video camera 2 specifically adapted to the flash laser radar, or may be inferred by the flash laser radar from existing 2-D camera 2 status signals and video signals. In the slave mode, the system controller 3 issues commands (ZOOM_CTRL) via bidirectional electrical connection 10 to the infrared optical receiver 4 to position its motorized zoom lens so as to focus at the same point in space as the 2-D camera 2. The infrared optical receiver 4 returns a ZOOM_STATUS signal indicating the position of its zoom lens back to the system controller 3 via bidirectional electrical connection 10.

In all cases, system controller 3 controls and initiates the pulsing of the laser transmitter 1 by sending a TX_PULSE signal via bidirectional electrical connection 9. System controller 3 also conditions the laser transmitter 1 output field of illumination by selecting a value for the variable diffuser lens (57 in FIG. 4) of the laser transmitter depending on the range value of interest and in cooperation with the zoom control of the infrared optical receiver 4. By coordinating the zoom lens of the infrared optical receiver 4 with the laser transmitter 1 variable diffuser lens 57, optimal overlap of the field of view of the infrared optical receiver 4 and the illumination pattern of the laser transmitter 1 can be effected. The system controller 3 also provides a system clock (SYS_CLK) to the laser transmitter 1, infrared optical receiver 4, and image processor 5 via bidirectional electrical connections 9, 10, and 11, respectively. When the laser transmitter 1 sends a pulse downrange upon command from the system controller 3, it feeds back to the system controller 3 via bidirectional electrical connection 9 a digital electrical signal (ZERO_REF) derived from a sample of the laser transmitter optical output which has been converted by an optical detector into an electrical signal, and amplified and threshold tested against a preset value. This ZERO_REF signal provides the zero time reference for the range counters which measure the range for any reflected portion of the transmitted laser pulse incident upon any one of the 16,384 pixels in a typical infrared focal plane array of infrared optical receiver 4. System controller 3 also provides internal status signals to, and receives control commands from, a supervising controller or director via bidirectional electrical connections 111.

Infrared optical receiver 4 in FIG. 1 also provides mechanical alignment of the laser transmitter 1 and 2-D video camera 2. These three component systems must have coincident fields of view, and therefore, the optical axes of the laser transmitter 1, 2-D camera 2, and infrared optical receiver 4 are aligned so as to converge at the maximum range limit of the flash laser radar system. The housing (55 in FIG. 4) of the infrared optical receiver 4 provides adjustable rigid mounting points 7 for laser transmitter 1, and 12 for 2-D camera 2. Angular adjustment of the optical axes is provided by fine thread screws and metal washers or shims together with mounting points 7 and 12. Multi-axis positioning of the 2-D focal plane array 42 within the housing 55 in FIG. 4 may also be utilized to achieve an overlapping field of view with the flash laser radar.

Finally, 2-D video camera 2 also provides a video or still signal 15 in a standard format for use in recording, transmission, or broadcast. The system controller 3 is also capable of operating as the master controller for the entire 3-D system, including the 2-D camera 2. When operating as the master, the system controller 3 controls all aspects of the flash laser radar as normal, and also controls the operation of the 2-D camera 2, controlling its zoom lens and coordinating and synching its 2-D outputs 13, 15 with the infrared optical receiver output 14.

FIG. 2 is a block diagram of the laser transmitter of a preferred embodiment denoted by the number 1 in FIG. 1. Shown is a high power pulsed laser 17, transmitter optics 19, and laser power detector 18. Pulsed laser 17 receives a TX_PULSE command 22 from system controller 3 via bidirectional electrical connection 9 and transmits a high power laser pulse from its output via optical path 24 to the transmitter optics 19. The transmitter optics 19 conditions the laser pulse for transmission through its output port 20 by spreading the narrow beam of the pulsed laser over a greater angle in order to illuminate the entire scene in the field of view of the laser radar. To effect this design, a diffusing lens is mounted on a wheel with a number of other diffuser lenses (57 in FIG. 4) with different angular values and is selectable via motorized positioner. The diffuser selection is controlled by the system controller 3 via electrical signal line 21. Electrical signal line 21 is bidirectional and also carries a status signal indicating the position and/or value of the variable diffuser 57 and is part of bidirectional electrical connections 9 between system controller 3 and laser transmitter 1.

Laser power detector 18 receives a sample of the optical output of pulsed laser 17 via optical transmission path 25 which may be a free space connection or fiber optic cable. The laser power detector is typically comprised of a 1570 nm PIN diode positioned to intercept a major portion of the optical transmission path 25, with output connected to an electronic amplifier and a threshold decision circuit. The amplifier of the preferred embodiment is a transimpedance amplifier, and the threshold decision circuit is a Schmitt trigger or voltage comparator. The output of the Schmitt trigger or voltage comparator is a slightly delayed digital signal 23 representing the time of transmission of the laser radar pulse, (ZERO_REF). This ZERO_REF signal 23 is provided to system controller 3 via bidirectional electrical connections 9 and may be provided to the infrared optical receiver 4 by system controller 3 or directly to the infrared optical receiver 4 by the laser transmitter 1.

FIG. 3 shows the infrared optical receiver 4 in block form. Receive optics 27 comprised of a fixed lens, optional beam splitter, and motorized zoom lens (47 in FIG. 4) intercepts a portion of the transmitted laser pulse reflected from the scene in the field of view 31. This light signal is conditioned and directed to fall as a focal plane array input 34 on receive sensor front end 26 which is a fused fiber breakout assembly (FFBA) coupled to a group of four 128×128 focal plane arrays of APD optical detectors in the preferred embodiment. Receive sensor front end 26 may also be part of a Proximity Focused Image Tube (PFIT) assembly, wherein the input facet is a photocathode plate. The receive sensor front end 26 is preferably an avalanche photodiode detector (APD) array coupled to the front end of a readout integrated circuit 64, but alternatives are anticipated and the various receive sensor front end 26 embodiments are discussed in detail in association with FIGS. 5, 6, and 7.

Drive electronics 28 produce a ZOOM_DRIVE output capable of driving the motorized zoom lens 47 of the receive optics 27 and transmits this drive signal to the zoom lens via bidirectional electrical connection 32. Drive electronics 28 also reads the shaft encoders or optical encoders indicating position of the zoom lens via bidirectional electrical connection 32 and produces a RX_ZOOM_STATUS signal for communicating to the system controller 3 over bidirectional communications line 33 which is bundled with bidirectional electrical connections 10 between optical receiver 4 and system controller 3. Bidirectional communications line 33 also serves to connect the ZOOM_CTRL signal from system controller 3 to drive electronics 28.

Drive electronics 28 also receives control commands from system controller 3 intended for receive sensor front end 26 including ZERO_REF timing information, transmitted pulse shape coefficients, system clock, calibration factors, etc. necessary for operation of the receive sensor front end 26 via bidirectional communications line 33. These signals are passed between drive electronics 28 and receive sensor front end 26 via bidirectional signal line 35. The drive electronics also generates the APD bias voltage, and provides this voltage to receive sensor front end 26, and receives numerous status signals from the receive sensor front end 26 via bidirectional signal line 35. Drive electronics 28 also controls the timing of the output electronics 29 conversion and transfer of raw data from the receive sensor front end 26 via electrical connection 39.

Receive sensor front end 26 provides range and intensity data to the output electronics 29 via electrical connection 36 when polled at the end of a laser pulse transmit cycle. A typical frame rate of 30 Hz allows for 33 mS between laser transmit pulses, which means there is ample time for the range gate to time out, and for the output electronics to readout the raw range and intensity data from the receive sensor, make its calculations, and transmit these calculated or reduced data via its electrical output 14. Given a maximum range of 10,000 feet, the range gate can close after 10 microseconds, conservatively, and no further reflected pulse should be expected. The output electronics 29 makes calculations based on the raw analog samples of the received light pulses to accurately fit the centroid of the transmitted laser pulse, allowing for a more precise estimate of time of arrival of the reflected laser pulse signal 31, and therefore a more precise measurement of the range datum indicated by the reflected laser pulse 31. These pulse shape fitting calculations are done for each pixel of the 16,384 pixels of the 128×128 focal plane array (FPA) of the preferred embodiment. The output electronics 29 also adjusts analog values of reflected pulse amplitude for any DC offsets or gain variance before passing these signals to an internal analog to digital converter. The corrected and adjusted digital representations of range and intensity are then transmitted via output 14.

Output electronics 29 also receives calibration data from the system controller 3 related to the offset and gain of the track and hold amplifiers driving the input to the analog to digital converter (ADC) of output electronics 29 via signal line 37 and returns status information to the system controller 3 via signal line 38. Both signal lines 37 and 38 are bundled with bidirectional electrical connections 10 between infrared optical receiver 4 and system controller 3.

Mechanical alignment interface 30 is comprised of mechanical mounting and alignment points 7 and 12 for the laser transmitter 1, and 2-D video camera 2, respectively. These mechanical mounting points are explained in detail in connection with FIGS. 4 and 8.

FIG. 4 shows a layout diagram in schematic form of the hybrid 3-D camera of FIG. 1. Laser transmitter 1 has a housing 40 which is attached to the main camera tube housing 55 of infrared optical receiver 4 by two brazed on bosses 1, and attachment hardware. The brazed on bosses 41 are fitted with fine pitch screws which allow for precision alignment of the laser transmitter housing 40 with the optical receiver housing 55. These bosses 41 and screws serve as the mechanical alignment interface 7 of FIG. 1 for this embodiment of the invention. Housing 55 serves as the mechanical alignment interface 12 of FIG. 1 as it connects and aligns the infrared optical receiver 4 to the 2-D camera 2 of FIG. 1 in this embodiment. Laser transmitter 1 illuminates the field of view of the infrared optical receiver 4 through variable diffuser lens 57. The diffuser lens is mounted on a wheel with a number of other diffuser lenses, each with a different transmission angle. These different diffuser lenses are selectable to always slightly exceed the field of view of the infrared optical receiver zoom lens 47, so all objects within the field of view of the infrared optical receiver 4 are illuminated by pulsed laser light.

In operation, visible light reflected from objects in the field of view enters the camera at the opening of the camera tube through fixed lens system 56. Reflected laser pulses at 1570 nm also enter the camera tube through fixed lens system 56. Beam splitter 46 is tuned to reflect light at 1570 nm and is positioned at an angle of approximately 45 degrees with respect to the optical axis. A reflected laser pulse returning to the camera through fixed lens 56 at 1570 nm will be directed perpendicularly by beam splitter 46 to pass through infrared optical receiver zoom lens 47, which has been specifically adapted for 1570 nm light signals. By this structure, reflected laser pulses at 1570 nm will be spatially separated from the visible light entering the camera through fixed lens 56. This separated 1570 nm signal will fall on receive sensor 54, centered in the focal plane of infrared optical receiver zoom lens 47. Receive sensor 54 is logically comprised of the receive sensor front end 26, drive electronics 28, output electronics 29, and the associated electrical connections of FIG. 3. Physically, the receive sensor 54 is comprised of the fused fiber breakout assembly (FFBA) of FIG. 9, APD array 69, interstitial circuit substrate 68, readout integrated circuit 64, printed circuit board assembly 63, receive sensor housing 51, and associated electrical connections as described in FIG. 5 in a preferred embodiment. Other adaptations of the receive sensor 54 are anticipated and expanded upon in FIGS. 6 and 7.

All other visible light signals entering the camera tube through fixed lens 56 are passed through beam splitter 46 largely unaffected. Beam splitter 46 is designed to be transparent to light in the visible range of approximately 400-750 nm. The visible light signal then passes through visible zoom lens 45, before falling on visible light detector array 42, centered in the focal plane of visible zoom lens 45. Visible light detector array 42 is typically a CCD or CMOS array responsive to light in the 400-1100 nm wavelength range. After visible light signals have been converted to electrical signals by visible light focal plane array detector 42, they are amplified, converted to digital format, and read out via flexible electrical connection 44, and array connector 43.

The receive sensor 54 must be positioned to overlap the field of view of visible light detector 42 as closely as possible. This requires lateral alignment of receive sensor 54 within the focal plane of zoom lens 47. This alignment is effected by loosening lock down screws 49, setting zoom lens 47 at its midrange, setting visible zoom lens 45 at its midrange, and manipulating receive sensor housing 51 laterally until the 3-D image of receive sensor 54 is coincident with the visible image produced by visible detector array 42. A suitable target at an appropriate distance, such as a grid of black bars several feet in front of a white background may be positioned at a midrange distance in front of the hybrid 3-D camera. Such a target allows for an easy comparison between visible imagery from the visible focal plane array 42 and the 3-D image produced by receive sensor 54.

Once an optimal alignment is achieved, lock down screws 49 are tightened, pulling flange 50 of receive sensor housing 51 tightly up against mounting point 48 of housing 55, thereby frictionally securing the position of receive sensor 54 in alignment with visible focal plane array 42. Readout of the receive sensor 54 3-D data is accomplished through flexible electrical connections 52 and array connector 53 securely mounted to receive sensor housing 51.

FIG. 5 shows a detailed view of a preferred embodiment of the receive sensor denoted by the number 54 of FIG. 4. Due to symmetry, only a single view of the 1×4 array of infrared APD FPAs is necessary, showing two infrared APD FPA elements of the 1×4 array in a side by side configuration. A curved portion 58 of a fused fiber breakout shown in detail in FIG. 9 accommodates the axial displacement of terminal collar 60 from a quadrant of lensed faceplate 76 also shown in FIG. 9. The fused fiber breakout allows for "tiling" of multiple infrared detector focal plane arrays 69 and their support circuits. In the preferred embodiment shown, four individual infrared FPAs 69, each with an active matrix of 128×128 detectors, are joined together via fiberoptic waveguides to operate as a 256×256 infrared focal plane detector array. Because the active area of the 1570 nm focal plane arrays 69 does not extend all the way to the chip boundary, simply laying the APD FPAs 69 side-by-side would result in line gaps where no detecting element is positioned. To avoid this basic problem of "tiling" a sensor, the fiber breakout is incorporated. The fiber breakout intercepts substantially all of the incoming light at the focal plane of the zoom lens 47 through a lensed faceplate 76, and splits the light into four ordered quadrants by means of four curved, light guiding waveguide bundles, 58. In a preferred embodiment, curved light guiding bundles 58 are flexible enough to allow for their optical alignment to multiple infrared focal plane array detectors 69.

Area 59 of the fused fiber breakout is shown by dashed lines, and is a region where the glass fibers are fused, epoxied, or overmolded to provide strain relief and mechanical stability where the fibers enter and exit the faceplate collar 75 and terminal collar 60. Screws 61 through mounting points 62 and the flange of terminal collar 60 provide means of securing the terminal collar in alignment with the elements of the 1570 nm focal plane array 69. Each infrared focal plane array 69 is comprised of a 128×128 square array of avalanche photodetectors (APDs) on 100 micron center-to-center pitch in the preferred embodiment. Precise alignment of the 128×128 array of detectors with the active area of light emanating from each of the optical fibers in the fiber bundle 58 is necessary to prevent optical losses and noise. This alignment may be effected by illuminating the lensed fiber faceplate 76 with various test patterns of 1570 nm light, ensuring the readout of these patterns is properly correlated for each of the four quadrant detector arrays, and by locking down the alignment screws 61 onto the receive sensor subassembly in each of the four quadrants. Support member 66 provides additional hard attachment points for screws 61.

Each infrared focal plane array 69 is flip chip mounted and illuminated through its backside which is proximate the polished end of fiber bundle 58 at terminal collar 60. The topside of infrared FPA 69 is mounted face down on optional interstitial circuit substrate 68 by means of solder balls, or indium or gold bumps, 67. Interstitial circuit substrate 68 may be alumina, silicon, or glass, with through hole plated vias to connect the APD FPA 69 with readout integrated circuit 64. Connection between interstitial circuit substrate 68 and the readout integrated circuit 64 is also made by means of solder balls, indium bumps, or gold bumps, 65. Interstitial circuit substrate 68 is preferably made of alumina, and may therefore contain capacitors large enough to decouple and stabilize the high voltage supply connected to APD focal plane array 69 of the preferred embodiment. Readout integrated circuit 64 receives an input electrical signal from the 1570 nm FPA 69 either directly, or through the optional interstitial circuit substrate 68, and amplifies this low level electrical signal via a transimpedance amplifier at each of its 16,384 inputs.

The readout integrated circuit 64 is comprised of unit cells of circuitry which process the signals from each detector in the infrared focal plane array 69 independently, in effect creating a 2-D array of flash laser radar channels. The unit cell circuitry of the readout IC 64 is arranged in a 128×128 array of circuits on 100 micron center-center spacing to match the APD focal plane array 69 spacing. The operations of the readout IC 64 are described in detail in association with FIG. 10. The readout IC 64 is mounted on printed circuit board assembly (PCBA) 63 which contains decoupling capacitors, firmware, voltage regulation, and various other support circuit functions not provided by readout IC 64. Inputs and outputs (I/Os) from readout IC 64 are connected via wirebonds 70 from pads on readout IC 64 down to corresponding pads on PCBA 63. Circuit traces on PCBA 63 then connect the readout IC 64 I/Os to flexible circuitry 52 and then to array connector 53. Alternatively, readout IC 64 I/Os are connected externally via flexible connection 71 and feedthrough pin array 73 insulated by insulator 72 from housing 51. In either case, the readout IC 64 outputs are conditioned by PCBA 63 for electrical transmission to an image processor 5 per FIG. 1 or to other user of the range and intensity data.

Hard attachment points 77 are provided on receive sensor housing 51 for locking down the input end of the fused fiber breakout assembly via faceplate collar 75 using lockdown screws, 74. Lateral alignment is not required at this interface, provided all mechanical parts are manufactured to minimum standards of precision. Alignment is required of the complete assembly and is accomplished as previously described via flange 50 and screws 49.

FIG. 6 shows an alternative embodiment of the receive sensor denoted by the number 54 of FIG. 4. Receive sensor housing 51 and some associated elements are not shown as they are largely unchanged, and so as to improve the clarity of the drawings. Shown in FIG. 6 is a Proximity Focused Image Tube (PFIT), which converts 1570 nm light incident upon the photocathode 78 into electrons. The electrons are then accelerated under vacuum and high voltage and are absorbed by a pixilated solid state detector 79. The photocurrent is then passed through interstitial circuit substrate 68 via conductive bumps 65 and 67 as in FIG. 5, to readout IC 64. Readout IC 64 functions are the same as for the example of FIG. 5, incorporating low noise amplification, analog sampling, pulse shape fitting, threshold testing, and timing of the returned laser pulse. Housing 80 provides an airtight vacuum chamber around photocathode 78, solid state detector 79, interstitial circuit substrate 68, and readout IC 64. Interstitial circuit substrate 68 in this configuration serves the dual purpose of providing connection between solid state detector 79 and readout IC 64, while also assuming the role of PCBA 63 in FIG. 5, providing decoupling capacitors, firmware, voltage regulation, and various other support circuit functions not contained on readout IC 64. External electrical connections are made through the vacuum envelope created by housing 80 via insulated feedthrough pin arrays, where insulators 72 and pins 73 form a hermetic seal with housing 80. Alignment of the fiber bundle to the detector array is accomplished as described previously in FIG. 5 by lockdown screws 61 and collar 60. Once the optical alignment is established, the PFIT receive sensor subassembly is attached via screws 80 and flange 81 to the receive sensor housing 51 at mounting points 62 as described previously in FIG. 5.

FIG. 7 shows a third alternative for the receive sensor denoted by the number 54 in FIG. 4. In this embodiment, the fused fiber breakout is eliminated. The APD detector array 83 now has rectangular, non-square dimensions. In this embodiment, APD focal plane array 83 has a 16:9 ratio, to better match motion picture and high definition (HD) video formats. The infrared FPA 83 dimensions are 320×180, and the center to center grid spacing is 100 microns. The optional interstitial circuit substrate 85 also has plated through hole vias on a rectangular 320×180 grid pattern to match the APD FPA 83. Readout IC 86 is also redesigned to match the 320×180 rectangular pattern of the APD FPA 83. The unit cells of readout IC 86 are maintained on a 100 micron center to center pitch, which matches both the APD FPA 83 and optional interstitial circuit substrate 85. Formed on the backside of backside illuminated APD focal plane array 83 is an array of hemispherical lenses 84 in a 320×180 pattern to match the spacing of APD elements in the focal plane array 83. This adaptation to a 16:9 aspect ratio of receive sensor 54 is intended to create the maximum effectiveness of the existing readout IC 86 and APD FPA 83 technological capability as applied to the special case of HD video cameras. The Type 3 receive sensor of FIG. 7 is intended to be coupled with an advanced visible image compression algorithm resident in image processor 5, which reduces the need for increasing the infrared FPA pixel density in the 3-D ranging system. By matching the aspect ratios of the HD video cameras, a less wasteful mapping of 3-D range data to the 2-D HD video can be achieved with a given number of 3-D pixels. This increased reliance on signal processing is an independent approach to increased 3-D object and scene resolution, which may be practiced alone or together with the previously described structures designed to multiply the number of arrays simultaneously brought to bear in the hybrid 3-D camera. FIG. 12 describes the operation of the image processor 5 in greater detail.

FIG. 8 shows an alternative mechanical layout of the hybrid 3-D camera of FIG. 1. The system is realized in a modular form, rather than integrated in the same camera tube 55 as in FIG. 4. Both layouts have advantages. The advantage of the layout of FIG. 8 is the ability to graft itself to industry standard 2-D video cameras, and to realize the attendant advantages of these advanced camera systems without having to bear the burden of recreating these camera systems as in the integrated system of FIG. 4. The advantage of the layout of FIG. 4 is its inherently lower susceptibility to alignment issues once the camera has left the confines of the manufacturing facility, and is in the field. In FIG. 8, the 2-D camera 2 has its own camera tube 87. All other aspects of the 2-D camera system are as described previously, except there is no beam splitter in the visible light path. A minimum of two mounting points 41 mechanically connect the visible 2-D camera 2 to the infrared optical receiver 4, and serve as mechanical interface 12 between visible 2-D camera 2 and infrared optical receiver 4. These mounting points 41 have adjustment features such as fine pitch screws, washers, and/or shims which allow for parallel adjustment of the optical axes of infrared optical receiver 4 and visible 2-D camera 2 such that they will intersect at some distant point along the optical axis of 2-D camera 2.

In the mechanical layout of FIG. 8, infrared optical receiver 4 now has its own separate housing 55 which is parallel to the housing 87 of the 2-D camera 2. Reflected laser pulses now enter through a separate fixed lens 88, and are imaged onto the focal plane of receive sensor 54 by zoom lens 47. Laser transmitter 1 housing 40 is attached to optical receiver housing 55 by at least two mounting points 41. Each mounting point 41 has its own set of fine pitch screws, washers, and/or shims to effect coaxial alignment with optical receiver 4 and housing 55.

FIG. 9 shows the fused fiber breakout assembly incorporated into the Type 1 and Type 2 receive sensors 54 depicted in FIGS. 5 & 6. In a preferred embodiment, the lensed fiber faceplate 76 is comprised of an array of 256×256 individual fibers. These fibers are held in position accurately on 100 micron center-center spacing by a flat and polished precision substrate perforated by a grid of 82.5 micron holes. These holes can accommodate the 80 micron fiber diameter of the preferred embodiment. Each fiber has an active area up to 75 microns in diameter. To reduce optical losses, each fiber site in the 256×256 array is overmolded with a hemispherical or aspherical lens array 76 as shown in FIGS. 5 and 6. In the preferred embodiment, the precision substrate is a silicon substrate and the through holes for the fiber waveguides are formed by photochemically etching the substrate. The through holes may taper from an entry diameter of 95 microns down to an exit diameter of 82.5 microns. The lateral dimensions of the precision substrate are also defined by photochemically etching the plate by well known techniques. The area 59 directly behind the lensed faceplate 76 and faceplate collar 75 is overmolded with glass, epoxy, or a polymer material to improve mechanical stability and relieve the strain on any individual fiber from an external bending moment.

The terminal collars 60 at the opposite end of the fused fiber assembly also abut a region 59 where the fibers are overmolded with glass, epoxy, or a polymer material to protect the fibers and improve mechanical rigidity. The terminal collar 60 encloses one quadrant of the fiber assembly, a 128×128 array of fibers held accurately in position on 100 micron pitch by a precision photochemically milled silicon plate as described above for the lensed fiber faceplate 76. The four quadrants of the lensed faceplate 76 are defined by the vertical centerline VC in FIG. 9, and the horizontal centerline HC in FIG. 9. Each quadrant shown in FIG. 9 is only shown as a 10×10 array to improve the clarity of the drawings. Clearance holes 89 allow for mounting of the faceplate collar to the receive sensor housing 51 at mounting point 77. Represented graphically in FIG. 9A are two possible arrangements of the four terminal plates 90. In first view, two of the plates 90 are moved along the vertical centerline illustrated by the line VC, one a positive displacement, and one negative. The other two plates 90 move only along the horizontal centerline, HC, one a positive displacement, the other a negative displacement. In the second view, all four plates 90 move radially out from the intersection of the vertical and horizontal centerlines. The second view, where all terminal plates 90 move radially is the configuration assumed by FIGS. 5 and 6. FIG. 9A illustrates the possibility of both uniaxial and biaxial bending of the curved section 58 of the fused fiber breakout assembly of FIG. 9.

In a second embodiment of the fused fiber breakout of FIG. 9, the fibers in the 256×256 array at the input are inserted into a mold capable of holding the fibers in precise alignment on a grid pattern with 100 micron pitch, and molten plastic is injected around the fibers, thus replacing the precision of the photochemically milled silicon plate with the precision of a plastic molded faceplate. The preferred material is Ultem®, a temperature stable engineering plastic material. The generic name is polyetherimide, and it may be glass fiber reinforced up to 30% for additional mechanical strength and stability. One advantage of this method is the low cost associated with molding, if the number to be manufactured is high. Achieving the precise tolerances for the mold to accurately place and hold all of the fibers in the array within a few microns of the desired 100 micron pitch is a difficult and time consuming task. Threading the fibers into the molding tool is also a time consuming task, but once these tasks are complete, a great number of these fused fiber breakout assemblies can be produced quickly and at a low marginal cost. A further advantage of the molding process is the ability of the mold to form the array of hemispherical or aspherical lenses over each fiber site in the array in the same molding step, eliminating the need for secondary operations to form the faceplate lens array 76.

In a further embodiment of the fused fiber breakout of FIG. 9, the faceplate and terminal plates are made up of a "sea of fibers" much smaller in diameter than the active area of each pixel in a typical infrared FPA 69. The dimension of a pixel in the 128×128 APD FP array 69 is typically 90 microns square. In this case, the fibers are on the order of 10 microns diameter or less, with an active area of up to 9 microns, and there is no need for a flat and polished precision silicon substrate. To begin the process, large core rectangular cross section fibers are fused together in bundles. These large diameter rectangular bundles are then drawn down to a finer dimension. The still rectangular drawn down bundles are then fused again, and drawn down further. This process can be repeated a number of times, finally producing rectangular fused bundles with an ordered array of very fine diameter fibers on the order of 5-10 microns. The fibers will have a rectangular cross section, aligned with the rectangular cross section of the bundle, and in order, so fibers do not cross or deviate from their internal planes. The final step is to bend the four individual fiber bundles 58 into one of the two profiles shown in FIG. 9A, and then join and fuse the input ends to form the input faceplate 76. Normal polishing of both input and exit ends follows. This method of forming the fused fiber assembly means there is no need to thread individual fibers (16,384) through 128×128 arrays of holes 4 times in the terminal plates of the first described method for forming the fused fiber breakout of FIG. 9. Some additional optical noise is incurred, because some of the light emanating from the very thin fibers will not be directed upon any pixel of APD FP array 69, but rather between pixels, or perhaps falling partially on and off of an active pixel area. However, if the fibers are drawn small enough in relation to the dimensions of the pixel active area, statistically, the noise will be reduced below an acceptable level.

FIG. 10 shows the structure of readout integrated circuit 64 of FIGS. 5 and 6. Each channel, or unit cell 91, of the readout IC 64 connects to an input of a transimpedance amplifier. The output of the transimpedance amplifier is split into two paths. The first path connects to a series connected high pass filter, amplifier, a second high pass filter, Schmitt trigger, and memory/peak time circuit which triggers a range counter. The second path connects the output of the TIA to a high pass filter whose output is then split into a third path and a fourth path. The third path connects to the input of a buffer amplifier which has an output connected to a peak detector/storage circuit, with output connected to an output amplifier of the selectable row/column type. The fourth path connects the output of the high pass filter to an amplifier with an output connected to a buffer amplifier, with the buffer amplifier output connected to an amplitude sampling and storage circuit. The readout circuit functions may be grouped together logically as frontend, drive, and output electronics. The front end is generically comprised of transimpedance amplifiers, high pass filters, secondary amplifiers, Schmitt triggers, memory/peak time circuits, analog sampling and storage circuits, curve fitting circuits, and counters. In short, the front end can be thought of as the circuits necessary to provide low noise amplification, pulse detection, and range measurement. The drive electronics have the APD high voltage bias circuits, row and column drivers for readout functions, and timing interface circuits. The output electronics contain high drive capability output buffer amplifiers, row and column multiplexers, analog to digital converters (A/D), and associated circuits. The readout integrated circuit 64 in U.S. Pat. No. 6,414,746 B1 describes in great detail the operations of the readout IC 64, and is incorporated herein by reference.

The most important aspect of the readout IC 64 as it relates to the present invention, is the relationship of the grid pattern of the unit cells to the grid pattern of the APD FP array 69. Generally, the readout IC 64 is called out as an N×M array, but in practice the preferred embodiment is an array of 128×128 unit cells 91. In order to be stacked in a multi-chip hybrid assembly, the grid pattern of the units cells 91 of readout IC 64 must be on a 100 micron pitch so the indium, gold, or solder bumps will make good electrical connections to the APD FP array chip 69 directly, or indirectly through the interstitial circuit substrate 68 which features the same grid pattern and 100 micron pitch as the APD FP array 69. FIG. 10 shows the layout of the readout IC 64 which comprises multiplexer/output driver circuit 90, column shift register circuit 92, row shift register circuit 93, and a 12×12 array of unit cells 91. FIG. 10 shows a 12×12 array of unit cells 91 for clarity, but it is understood the preferred array dimensions are 128×128 unit cells 91 on the readout IC 64.

FIG. 11 shows yet another configuration of the invention. Using four of the described infrared optical receivers 4, one laser transmitter 1, and one 2-D camera 2 with an optical viewing axis 97, and by overlapping the circular fields of view created by each of the four infrared optical receiver lens systems, equivalent results may be obtained as for the "tiled" detector arrays 69 described in FIGS. 5 and 6. Each infrared optical receiver 4 has an individual rectangular field of view 96 defined by the projection of the 128×128 APD FP array through its lens system which subtends a portion of its circular field of view. The composite rectangular field of view of the four combined infrared optical receivers 4, each with a 128×128 element APD FP array 69 is shown as a region outlined by heavy dashed lines 95. In normal operation, the rectangular field of view 95 is the same for both the 2-D camera focal plane array 42 and the rectangular field of view of the combined four infrared optical receivers 4, and both subtend a portion of the smaller circular field of view 94 of the 2-D camera 2. In some cases, it may be desirable to narrow the field of view 95 of the four combined infrared optical receivers 4 relative to the 2-D camera 2. This case is shown by the larger diameter circle 94 which represents the circular field of view of 2-D camera 2. When greater 3-D pixel detail is desirable in a central region of the picture, the director may use the 2-D camera as a wide field of view, or scenic camera, and focus the viewer, and the density of the 3-D imagery, in a central portrait zone 95. This region 95 may be zoomed out to be coincident with the circular field of view 94 of the 2-D camera 2, or zoomed in to a central region of interest by the system controller 3 in conjunction with commands from the director and the individual zoom control inputs of the four infrared optical receivers 4.

In effect, the four infrared optical receivers 4 each with a single 128×128 APD detector array, replace the single infrared optical receiver 4 with four "tiled" 128×128 APD FP arrays, of FIGS. 1 and 5. The operation with respect to FIG. 1 is similar, with image processor 5 still accepting inputs from 4 independent 128×128 arrays. These 4 arrays are instead housed in 4 different receive sensor housings 51, each attached to a separate camera tube 55, as opposed to being tiled within one receive sensor housing 51. Electrical connections 14 are now from four separate infrared optical receivers 4, but the block diagram of FIG. 1 is unchanged. It can be seen the major difference is the duplication of the receive optics lenses 55 and 47, and housings 55, 51 of FIG. 8. The four optical receivers 4 are each adjustably attached to the 2-D camera 2 by at least two mounting points 41, also as shown in FIG. 8. Similarly, the laser transmitter 1 is also attached to the 2-D camera 2 body by at least two mounting points 41. Precise mechanical alignment of the 2-D camera 2, laser transmitter 1, and multiple optical receivers 4 is required so the rectangular fields of view of the individual optical receivers 96 are mutually overlapping to produce the continuous rectangular field of view 95 along optical axis 97. This alignment is effected as described previously in FIGS. 4 and 8, by adjusting the fine pitch screws or using washers/shims together with mounting points 41 for each of the four optical receivers 4 of FIG. 11.

Shown in detail in FIG. 12 in block diagram form is the image processor 5 of FIG. 1. The image processor 5 is realized in a programmable logic circuit (PLC) with associated software and firmware in the preferred embodiment, but may be realized as a full custom or semi-custom integrated circuit. In the full custom or semi-custom circuit realization, more functions can be reduced to hard wired circuitry, with a reduced set of software and firmware functions, and a higher speed of execution of the described processes. The image processor may also be realized completely in software and run on a stand-alone or embedded computer, with attendant reductions in the speed of the processing algorithm.

The complexity of visible focal plane arrays for high definition video is in the range of 2 megapixels, and the available number of true 3-D laser radar pixels at present is a maximum of 256×256, or 65,536 pixels in the tiled array shown in FIGS. 5 and 6. This ratio is approximately 16:1, so for a very basic approach, one could simply overlay each 3-D range pixel over 16 visible 2-D pixels. This would place one range pixel at the center of every 4×4 grid of 2-D visible pixels. Each of the 16 2-D visible pixels could then be assigned the range of the overlayed 3-D pixel. This has been done and has been found to produce acceptable, though less than optimal results. A more thoughtful approach would be to use spatial compression of the 2-D image and to use the range data to create object and scene knowledge. In the image processor 5, 2-D video data is received on electrical connections 13 and compressed by the video frame (VF) compressor 98 according to the rules best adapted to the 2-D scene data. The following example of geometrical compression illustrates the advantages of the technique of using spatial compression of the 2-D visible image prior to merging with the 3-D range data.

Suppose a region R, of uniform color exists in the 2-D visible data. Suppose further this region R has straight line borders. Then this region R can be approximated by a triangle, square, pentagon, hexagon, or combination of these polygons by VF compressor 98. The 3-D range data is received by range data (RD) mapper 99 via electrical connections 14 from the optical receiver 4. The RD data mapper 99 then simply associates 3-D range data with point groups in the 2-D space. The compression vector range (CVR) processor 100 then determines for each region R with a given set of compression vectors, which 3-D range data are to be assigned to each region R, and especially, to its boundaries. If any given polygon subtends at least three 3-D range data points, this polygon can be unambiguously "tilted" in 3-space, since the three range values can fully determine the orientation of a plane in 3-space. This tilting operation is accomplished by geometric tilt and surface (GTS) calculator 101. If any polygon subtends four or more points, a 3-D curved surface can be defined which best fits the 3-D range data to region R, and the polygon boundaries, again through the operation of GTS calculator 101. A simple test can determine if the four points lie in a plane, or require a 3-D surface to fit the data and the polygon boundaries. For regions R which have regular curved boundaries, the compression algorithm of VF compressor 98 may choose to describe the boundary as a simple circular or elliptic arc section, polynomial curve, or exponential curve, if a good mathematical fit is possible. Such treatment of curved boundaries can result in a greater degree of compression and better fit to the image than the alternative, which would be to break up the curved section into arbitrarily small triangles, squares, and other more complex polygons. If the region R is too small to contain three 3-D range points, its boundaries can be assigned the 3-D range data of the adjoining region by CVR processor 100, and the region R may still be adjusted in 3-D to conform to a continuous 3-D object. In this case, the zero, one, or two 3-D range pixels within the region R are augmented by the interpolated range data for the boundaries of the region R determined by CVR processor 100, and the planar tilt or complex 3-D surface then can be calculated by GTS calculator 101. Other spatial compression algorithms may be used which rely on wavelets, fractals, etc. These other spatial compression algorithms are very effective and may be used in preference to the described technique in some embodiments of the invention.

In order to combine 2-D compressed images with 3-D range data, some assumptions have been made. It is assumed the 3-D data are to be associated with objects in the field of view. These objects may be stationary, and changing only in their color imagery, example; reflection of street traffic on a large plate glass window in a business district. This makes the object part of a backdrop for those other objects which may be changing in their 3-D images, example: an athlete in motion, whom, when viewed as a 3-D object, varies both in position and configuration if running, throwing a ball, or diving into a pool of water. Object recognition algorithms resident in 3-D object recognition and definition 3D (ORD) processor 102 search the scene data received from GTS calculator 101 for sets of data points, or image vectors which appear together at different locations in the scene at different points in time. Therefore, only limited object recognition can be done on the basis of a single frame, unless prior knowledge of the potential number and types of objects can be stored in system memory and correlated against patterns detected in the scene data. An example could be image vectors stored in a military database which catalogs types of tanks, trucks, helicopters, planes, ships, or other possible targets. These types of stored image vectors might be present in scene data from one still image frame, and the recognition of these types of objects can be measurably improved and accelerated with 3-D range data. Otherwise, scene data is continually searched frame-by-frame for these associations of 3-D image vectors, and objects are recognized and in some cases, further defined, mathematically by the 3D ORD processor 102 based solely on mathematical principles; i.e.; associated motion, closed vs. open surfaces, etc. Object definition is a higher form of object recognition. Object definition assumes some parts of an object have been recognized, for example; the trunk, ears, head, and tail of an elephant, though the body may be partially obscured. Based on known elephant data, and appropriate curve fitting, the open elephant surfaces are closed mathematically, and the elephant object thus is completed, albeit imperfectly. The output 8 of the 3-D object recognition and definition processor 102 is then made available for higher level object recognition associated with multiple viewing axes.

Finally, once the compressed 2-D image vectors have been associated with range and adjusted for tilt, surface, and boundary conditions, the still or video frame must be decompressed, or mapped into a 3-D image format, for recording or output to a display device. This decompression is accomplished by the 3D image frame decompression IFD processor 103, and the output 16 conditioned for the appropriate recording or display media.

Recording may take place onto any convenient memory medium. A typical display device may be a flat screen display, which may be used to display a particular range or affine projection of image data. Alternatively the display may depict a two dimensional representation of a three dimensional object from a particular vantage point and permit the representation to depict the object as if seen from different vantage points or rotated and translated to different vantage points.

FIG. 13 illustrates a higher level production system utilizing the present invention. A trio of hybrid 3-D cameras, A, B, and C, 104 are linked together via bidirectional fiber optic link 106, duplex fiber optic cable 107, and 3-D object processor and scene compositor 3D (OPS) 108. Electrical connections 105 connect the respective bidirectional fiber optic links to the various hybrid 3-D cameras employed by the director in viewing the subject 110. Uplinked to the 3D OPS compositor 108 from each camera 104, are 2-D video data 15 including sound, 3-D object data 8, 3-D composite video 16, and system controller status/control 111 through electrical connections 105, fiber optic link 106, and optical fiber 107. Downlinked from the 3D OPS compositor 108 to each hybrid 3-D camera 104 are camera control commands 111, object recognition data for the image processor 5, and an audio link for the producer and cameraman to communicate. The 3D OPS compositor takes input from each of the three hybrid 3-D cameras 104 and creates improved object and scene data. When an object such as the football player 110 is viewed from only a single point of view, only a 3-D model of those parts in view can be made. Any areas in shadow must either be left out of the model or extrapolated. For a well-behaved object such as a football or goal posts, this extrapolation can achieve excellent results. Otherwise, the object 110 must be rotated, and multiple views recorded, or, as in the present invention, simultaneously captured from a multiplicity of angles not in the same plane.

The football player 110, being an irregular object, must be viewed from, at the very least, two optimal angles to produce a realistic 3-D solid model, and since the angles are not always optimal, three cameras are best in practice for producing realistic 3-D object models. Simple viewing in 3-D could be done from a single point of view with a single hybrid 3D camera, but futuristic video experiences rely on the ability of the observer to walk into the scene, turn, view in an arbitrary direction, and walk out via a different path, if desired. This type of viewing experience requires the capability of the 3D OPS compositor 108, to create solid models of the objects and scenery in view, and communicate these data signals to an appropriate recording or display device via output 109, so the observer may immerse his/her self in the scene and the action. Although the invention of the hybrid 3-D camera and production system has been specified in terms of preferred and alternative embodiments, it is intended the invention shall be described by the following claims and their equivalents.

Although the invention is described by particular embodiments, it should be understood that the invention may be implemented in other manners and should be considered to be defined by the claims that follow.

What is claimed is:

1. A hybrid three dimensional camera system comprising:
a pulsed infrared laser transmitter providing an output laser pulse upon command from a system controller;
an optical sampler adapted to sample the output of the laser transmitter and provide the optical sample via optical transmission path to a laser power detector, said laser power detector having a laser power detector electrical signal indicating the time of transmission of the laser pulse;
a two dimensional visible light camera, having a field of view, the two dimensional visible light camera incorporating an array of visible light optical detectors positioned at the focal plane of a motorized zoom lens and a two dimensional image output, said zoom lens adapted to optimize overlap of the two dimensional visible light camera field of view and the output laser pulse;
a pixilated infrared optical receiver incorporating an array of infrared optical detectors positioned at the focal plane of a lens system and each optical detector of said array producing an electrical output pulse at a terminal of said optical detector in response to a reflected laser pulse, and each optical detector having said terminal electrically connected to an input of a unit cell electrical circuit of a readout integrated circuit;
said readout integrated circuit having an array of unit cell electrical circuits, and each unit cell electrical circuit having an input adapted to receive an electrical output pulse from an optical detector of said array of infrared optical detectors, and each unit cell electrical circuit having a timing circuit initiated by said laser power detector electrical signal, and said timing circuit terminating upon receipt of an electrical output pulse from an optical detector of said array of infrared optical detectors; and
said readout integrated circuit having an output providing range and intensity data for each optical detector of said array of infrared optical detectors receiving an incident reflected light portion of said output laser pulse;
an image processor which merges the output of said two dimensional visible light camera with the range and intensity data output of said infrared optical receiver to produce a three dimensional visible picture output;
a system controller which initiates the pulsing of said pulsed laser transmitter and which controls the operation of said two dimensional visible light camera zoom lens, as well as the timing of the output of said infrared optical receiver and the timing of said image processor three dimensional visible picture output.

2. The hybrid three dimensional camera system of claim 1 wherein the infrared optical receiver and two dimensional visible light camera are separately housed and said infrared optical receiver provides at least two adjustable mounts for establishing coaxial mechanical alignment of said infrared optical receiver and the two dimensional visible light camera.

3. The hybrid three dimensional camera system of claim 1 wherein ambient visible light and reflected infrared light enter a lens tube of a camera housing coaxially, and are angularly separated by a dichroic optical element, and a focal plane array of the infrared optical receiver is mounted within the camera housing to receive said reflected infrared light, and a focal plane array of the two dimensional visible light camera is mounted within the camera housing to receive said ambient visible light.

4. The hybrid three dimensional camera system of claim 1 further comprising a fused fiber breakout having an ordered array of light guiding fibers, said array of light guiding fibers, with an input face and at least one output face, positioned with the input face at the focal plane of the lens system, said input face receiving a reflected portion of the transmitted laser pulse as a light signal image and transmitting said light signal image through a length of an optical wave guiding fiber bundle in an ordered fashion to preserve a light signal image, to at least one array of infrared optical detectors.

5. The hybrid three dimensional camera system of claim 4 wherein the fused fiber breakout is fused at the input face and at least one output face.

6. The hybrid three dimensional camera system of claim 5 wherein said length of an optical wave guiding fiber bundle is contoured in at least one axis, and provides a translation of the light signal image incident upon an input face on at least one lateral axis at an output face.

7. The hybrid three dimensional camera system of claim 4 wherein the input face of the fused fiber breakout incorporates a precision substrate perforated by a two dimensional array of holes, each hole centered on a rectangular grid pattern and passing through said substrate, said holes adapted to accept and retain an optical fiber of an optical fiber bundle.

8. The hybrid three dimensional camera system of claim 4 wherein the input face of the fused fiber breakout is overmolded by an array of lenses, each lens being centered over a light guiding fiber.

9. The hybrid three dimensional camera system of claim 4 wherein a fiber of the fused fiber breakout has a rectangular cross section.

10. The hybrid three dimensional camera system of claim 4 wherein an output face of the fused fiber breakout is held in optical alignment to a two dimensional array of infrared optical detectors.

11. The hybrid three dimensional camera system of claim 1 wherein the array of infrared optical detectors is situated atop an integrated circuit substrate with an array of electrically conductive bumps, each bump making electrical contact with an electrical contact of an element of the two dimensional array of infrared detectors.

12. The hybrid three dimensional camera system of claim 1 wherein the array of infrared optical detectors is a two dimensional array of avalanche photodiodes.

13. The hybrid three dimensional camera system of claim 1 wherein the array of infrared optical detectors is a two dimensional array of PIN photodiodes.

14. The hybrid three dimensional camera system of claim 4 wherein an output face of the fused fiber breakout is held in optical alignment to a proximity focused image tube.

15. The hybrid three dimensional camera system of claim 1 wherein said array of infrared optical detectors has a rectangular aspect ratio of sixteen to nine.

16. The hybrid three dimensional camera system of claim 1 wherein the array of infrared optical detectors is a two dimensional array, and is situated atop a readout integrated circuit with a corresponding two dimensional array of electrically conductive bumps, each bump making electrical contact with an electrical contact of an element of the two dimensional array of infrared optical detectors and each bump further making electrical connection to a unit cell of said readout integrated circuit,
  wherein a unit cell of said readout integrated circuit includes a flash laser radar receiving and pulse detection and timing circuit adapted to produce range data for any reflected portion of a transmitted laser pulse incident upon any element of the two dimensional array of infrared optical detectors.

17. A 3D imagery production system comprising:
a plurality of hybrid 3D cameras, each hybrid 3D camera of said plurality of hybrid 3D cameras having a field of view, and adapted to develop a 3D visual image by combining the output of a 2D visible light focal plane array detector with a 3D camera;
a zoom lens adapted to optimize overlap of the 2D visible light focal plan array detector and the field of view of a 3D camera;
each 3D camera including a scene illuminating pulsed infrared laser transmitter; and
each laser transmitter having an optical sampler adapted to sample the output of the laser transmitter and provide the optical sample via optical transmission path to a laser pulse detector;
said laser pulse detector having a laser pulse detector output indicating the time of transmission of a laser pulse; and each 3D camera further including a plurality of optical detector electrical outputs from a pixellated infrared focal plane array detector, and each of said optical detector electrical outputs adapted to detect a reflected laser pulse; and
each of said optical detector electrical outputs connected to an amplification and range determining circuit of a companion unit cell electrical circuit of a mating readout integrated circuit;
wherein the range determining circuit within each unit cell electrical circuit comprises a timer which is initiated by said laser pulse detector output, and said timer terminated upon arrival of a reflected laser pulse, the range measuring circuit thus adapted to measure the range to a point in a scene of interest;
wherein each hybrid 3D camera further includes a viewing axis directed towards a common object or scene of interest, each said viewing axis separated by a solid angle from the viewing axis of any other hybrid 3D camera of said 3D imagery production system;
wherein each hybrid 3D camera further includes a communications link to a central processor, the central processor adapted to merge the outputs of said hybrid 3D cameras into a 3D solid model of an object within the common field of view of the hybrid 3D cameras.

18. A hybrid three dimensional camera system comprising:
a pulsed infrared laser transmitter providing an output laser pulse upon command from a system controller;
an optical sampler adapted to sample the output of the laser transmitter and provide the optical sample via optical transmission path to a laser power detector;
said laser power detector having a laser power detector electrical signal indicating the time of transmission of the laser pulse;
a two dimensional visible light camera incorporating an array of visible light optical detectors positioned at the focal plane of a visible light transmissive lens and with a two dimensional image output;
a pixilated infrared optical receiver incorporating an array of infrared optical detectors positioned at the focal plane of an infrared light transmissive lens, and each optical detector of said array producing an electrical output pulse at a terminal of said optical detector in response to a reflected laser pulse, and each optical detector having said terminal electrically connected to an input of a unit cell electrical circuit of a readout integrated circuit;
said readout integrated circuit having an array of unit cell electrical circuits, and each unit cell electrical circuit having an input adapted to receive an electrical output pulse from an optical detector of said array of infrared optical detectors, and each unit cell electrical circuit having a timing circuit initiated by said laser power detector electrical signal, and said timing circuit terminated upon receipt of an electrical output pulse from an optical detector of said array of infrared optical detectors; and said readout integrated circuit providing, through an output, range and intensity data for any pixel element of said array of infrared optical detectors receiving an incident reflected light portion of said output laser pulse;
an image processor which merges the output of said two dimensional visible light camera with the range and intensity data output of said infrared optical receiver to produce a three dimensional visible picture electrical output;
a system controller which initiates the pulsing of said pulsed laser transmitter and which controls the operation of said two dimensional visible light camera and the infrared optical receiver, and further controls the timing of the output of said infrared optical receiver and the timing of said image processor three dimensional visible picture electrical output.

19. The hybrid three dimensional camera system of claim 18 wherein the infrared optical receiver and two dimensional visible light camera are separately housed and said infrared optical receiver provides at least two adjustable mounts for establishing coaxial mechanical alignment of said infrared optical receiver and the two dimensional visible light camera.

20. The hybrid three dimensional camera system of claim 18 wherein said two dimensional array of infrared optical detectors is situated atop an integrated circuit substrate having an array of electrically conductive bumps, each bump making electrical contact with an electrical contact of an element of the said two dimensional array of infrared detectors.

* * * * *